United States Patent
Noda et al.

(10) Patent No.: US 11,255,874 B2
(45) Date of Patent: Feb. 22, 2022

(54) MEASUREMENT APPARATUS, MEASUREMENT METHOD, PROGRAM, AND INFORMATION RECORDING MEDIUM

(71) Applicant: RIKEN, Saitama (JP)

(72) Inventors: Shigeho Noda, Saitama (JP); Ryutaro Himeno, Saitama (JP)

(73) Assignee: RIKEN, Saitama (JP)

( * ) Notice: Subject to any disclaimer, the term of this patent is extended or adjusted under 35 U.S.C. 154(b) by 801 days.

(21) Appl. No.: 16/075,433

(22) PCT Filed: Feb. 7, 2017

(86) PCT No.: PCT/JP2017/004361
§ 371 (c)(1),
(2) Date: Aug. 3, 2018

(87) PCT Pub. No.: WO2017/141766
PCT Pub. Date: Aug. 24, 2017

(65) Prior Publication Data
US 2019/0041424 A1    Feb. 7, 2019

(30) Foreign Application Priority Data
Feb. 15, 2016   (JP) .............................. JP2016-026361

(51) Int. Cl.
*G01P 15/18*   (2013.01)
*A63B 43/00*   (2006.01)
(Continued)

(52) U.S. Cl.
CPC .............. *G01P 15/18* (2013.01); *A63B 43/00* (2013.01); *G01P 3/44* (2013.01); *G01P 7/00* (2013.01);
(Continued)

(58) Field of Classification Search
CPC ................................. G01P 15/18; A63B 43/00
See application file for complete search history.

(56) References Cited

U.S. PATENT DOCUMENTS

| | | | |
|---|---|---|---|
| 2003/0163282 A1* | 8/2003 | Krieg ..................... | G01C 21/16 702/152 |
| 2003/0163287 A1* | 8/2003 | Vock ..................... | A61B 5/1118 702/187 |

(Continued)

FOREIGN PATENT DOCUMENTS

JP    2012-58066 A    3/2012

OTHER PUBLICATIONS

McGinnis, A Highly Miniaturized, Wireless Inertial Measurement Unit for Characterizing the Dynamics of Pitched Baseballs and Softballs, 2012, Sensors, ISSN 1424-8220, pp. 11933-11945 (Year: 2012).*

(Continued)

*Primary Examiner* — Lisa E Peters
(74) *Attorney, Agent, or Firm* — Ohlandt, Greeley, Ruggiero and Perle, LLP

(57) ABSTRACT

In a measurement unit, a primary acceleration sensor is fixed at the center of gravity of a flying object or at a position within a certain error range from the center of gravity. A secondary acceleration sensor is fixed inside the flying object so as to be spaced from the center of gravity of the flying object. In a measurement apparatus, an acquirer acquires a primary acceleration measured by the primary acceleration sensor during flight of the flying object and a secondary acceleration measured by the secondary acceleration sensor during the flight of the flying object. An estimator estimates a spin rate per unit time of the flying object (Continued)

from the acquired primary acceleration and the acquired secondary acceleration using maximum likelihood estimation.

16 Claims, 15 Drawing Sheets

(51) Int. Cl.
    *G01P 3/44* (2006.01)
    *G01P 7/00* (2006.01)
    *G07C 1/22* (2006.01)

(52) U.S. Cl.
    CPC .......... *G07C 1/22* (2013.01); *A63B 2220/35* (2013.01); *A63B 2220/44* (2013.01); *A63B 2225/52* (2013.01)

(56) References Cited

U.S. PATENT DOCUMENTS

| | | | | |
|---|---|---|---|---|
| 2010/0299003 | A1* | 11/2010 | Hanson | G01C 23/00 701/4 |
| 2012/0203487 | A1* | 8/2012 | Johnson | G01C 25/005 702/104 |
| 2013/0073248 | A1* | 3/2013 | Perkins | A63B 59/50 702/141 |
| 2013/0197792 | A1* | 8/2013 | Wolfram | G01M 1/125 701/124 |
| 2014/0352431 | A1* | 12/2014 | Leclerc | G01C 19/5712 73/504.04 |
| 2015/0168440 | A1 | 6/2015 | Kang et al. | |

OTHER PUBLICATIONS

Talla, Powering the Next Billion Devices with Wi-Fi, May 26, 2015, University of Washington, pp. 1-13 (Year: 2015).*

IEEE, 2004, Draft Recommended Practice for Inertial Sensor Test Equipment, Instrumentation, Data Acquisition, and Analysis, Document No. P1554/D15a, pp. i-128 (Year: 2004).*

International Search Report dated Mar. 7, 2017 from corresponding International PCT Application No. PCT/JP2017/004361, 2 pages.

* cited by examiner

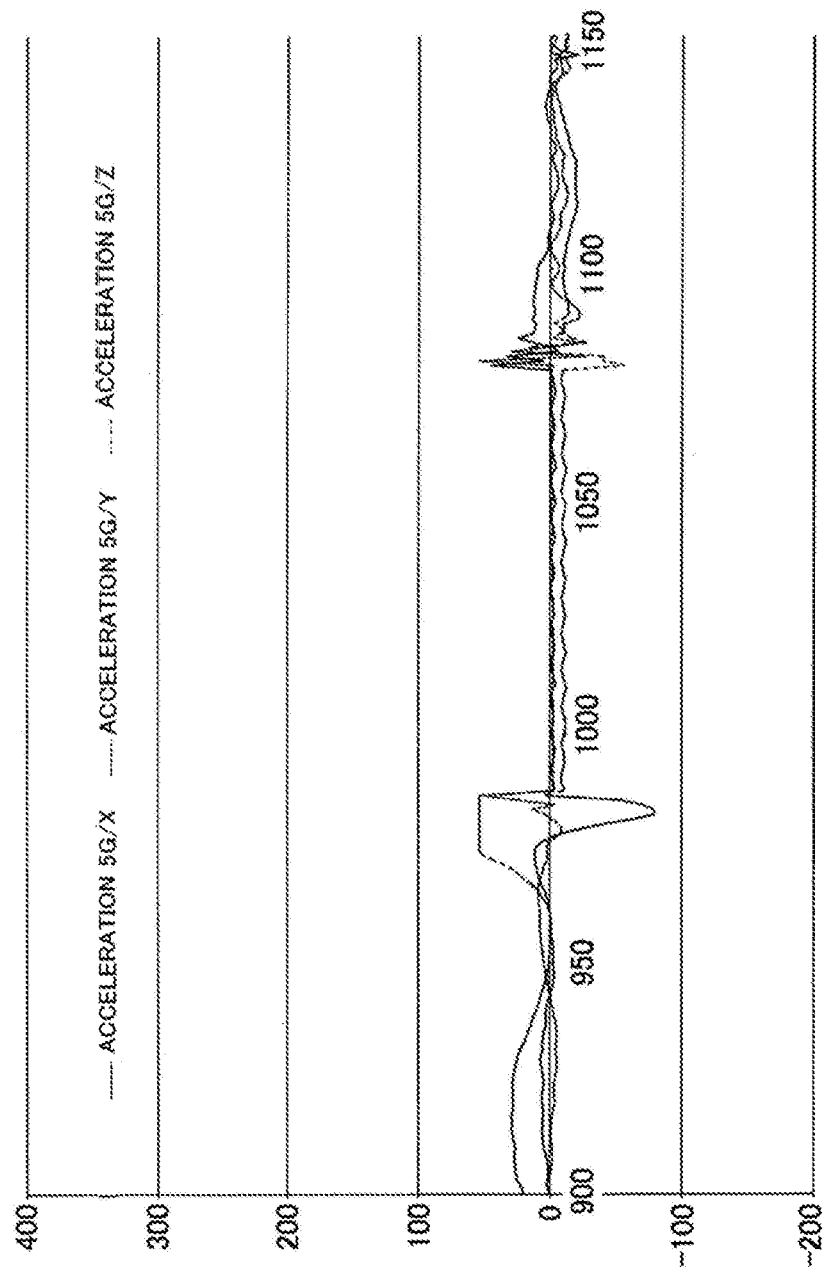

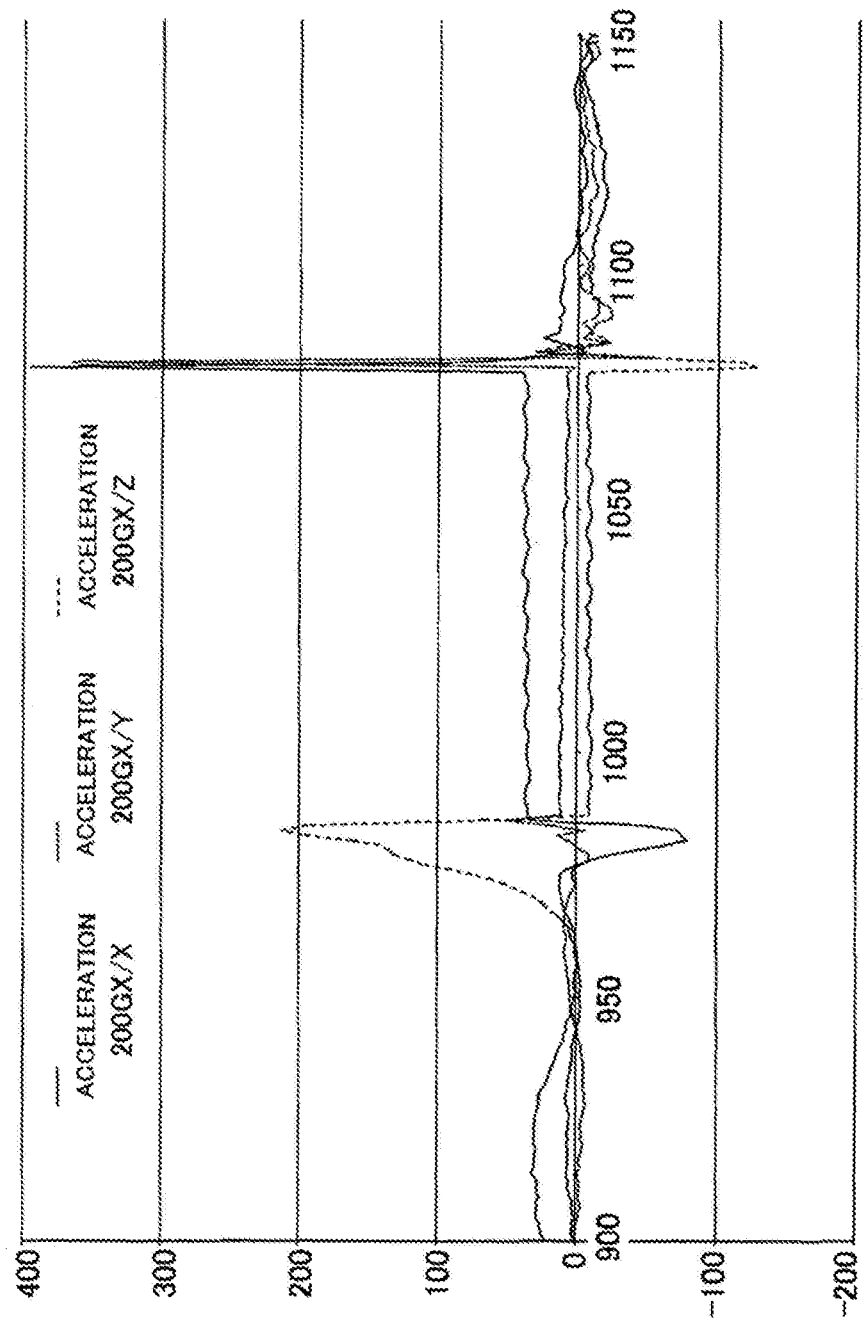

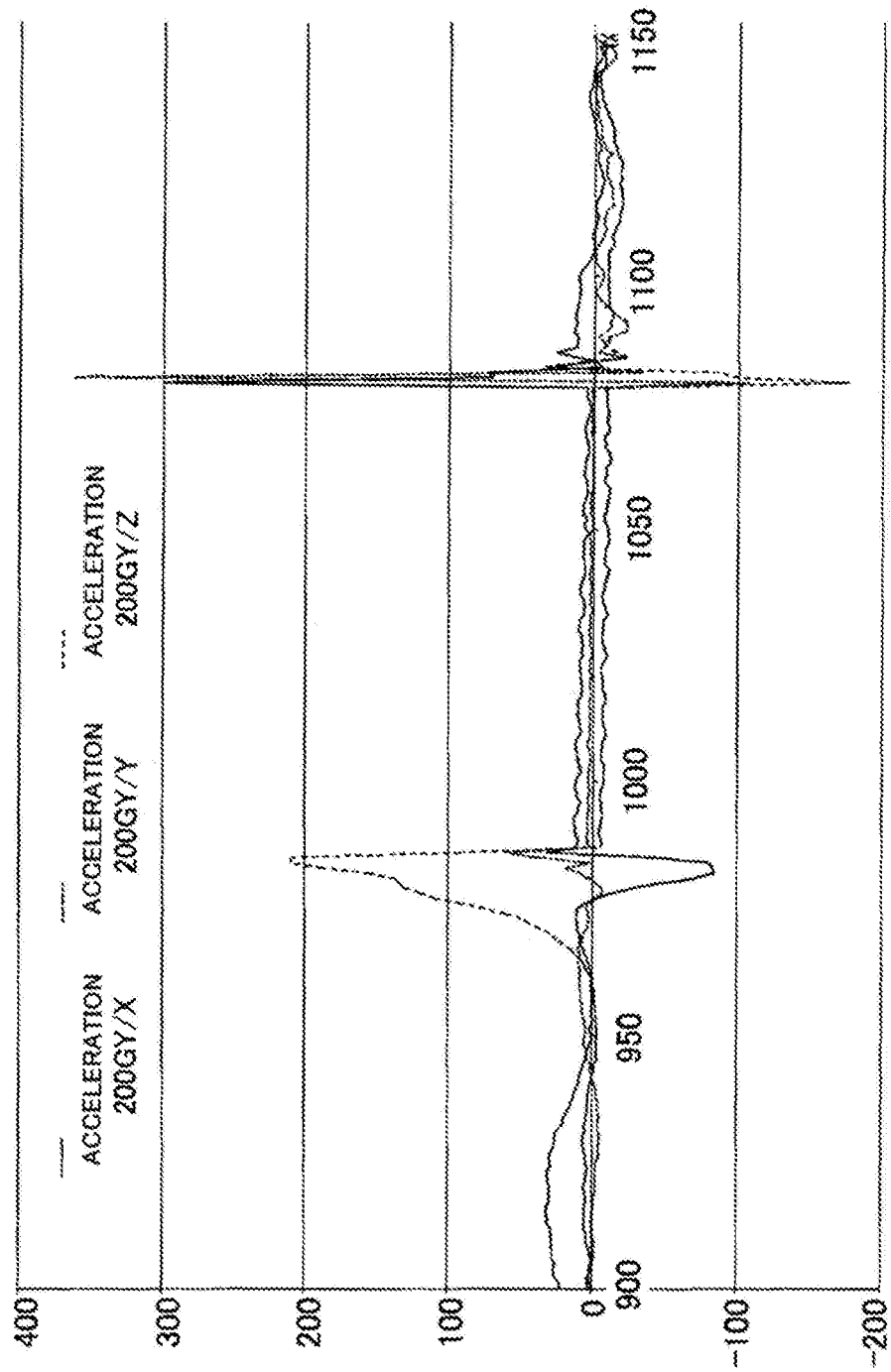

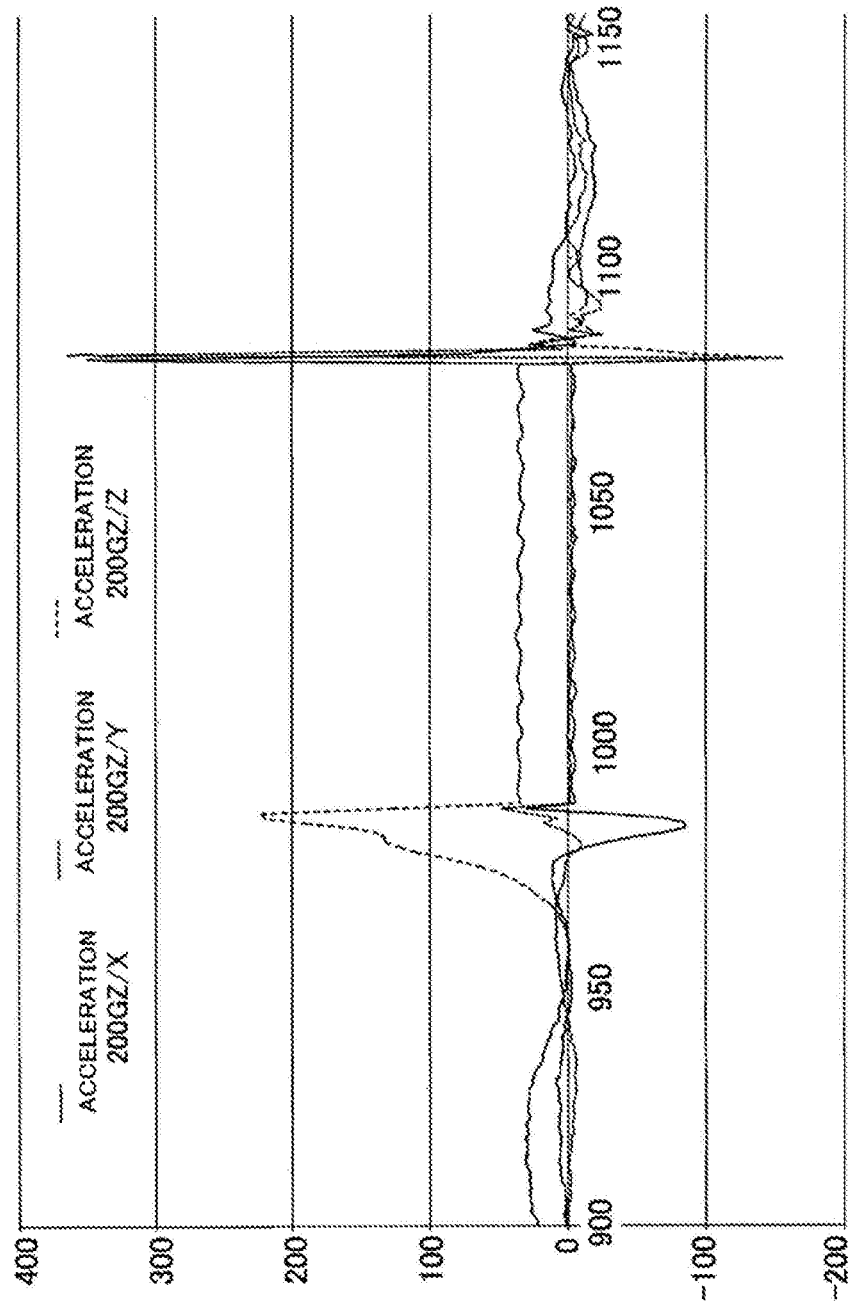

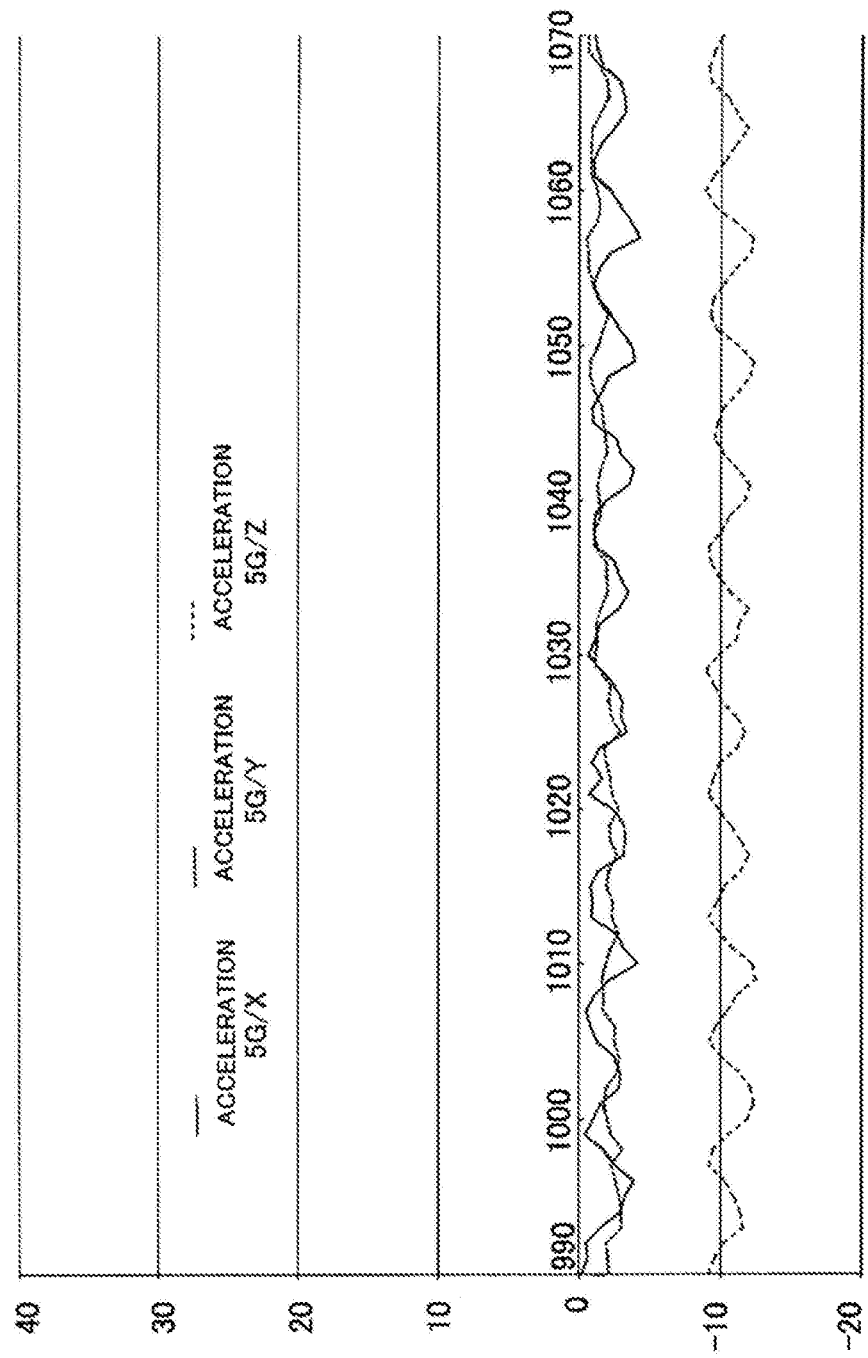

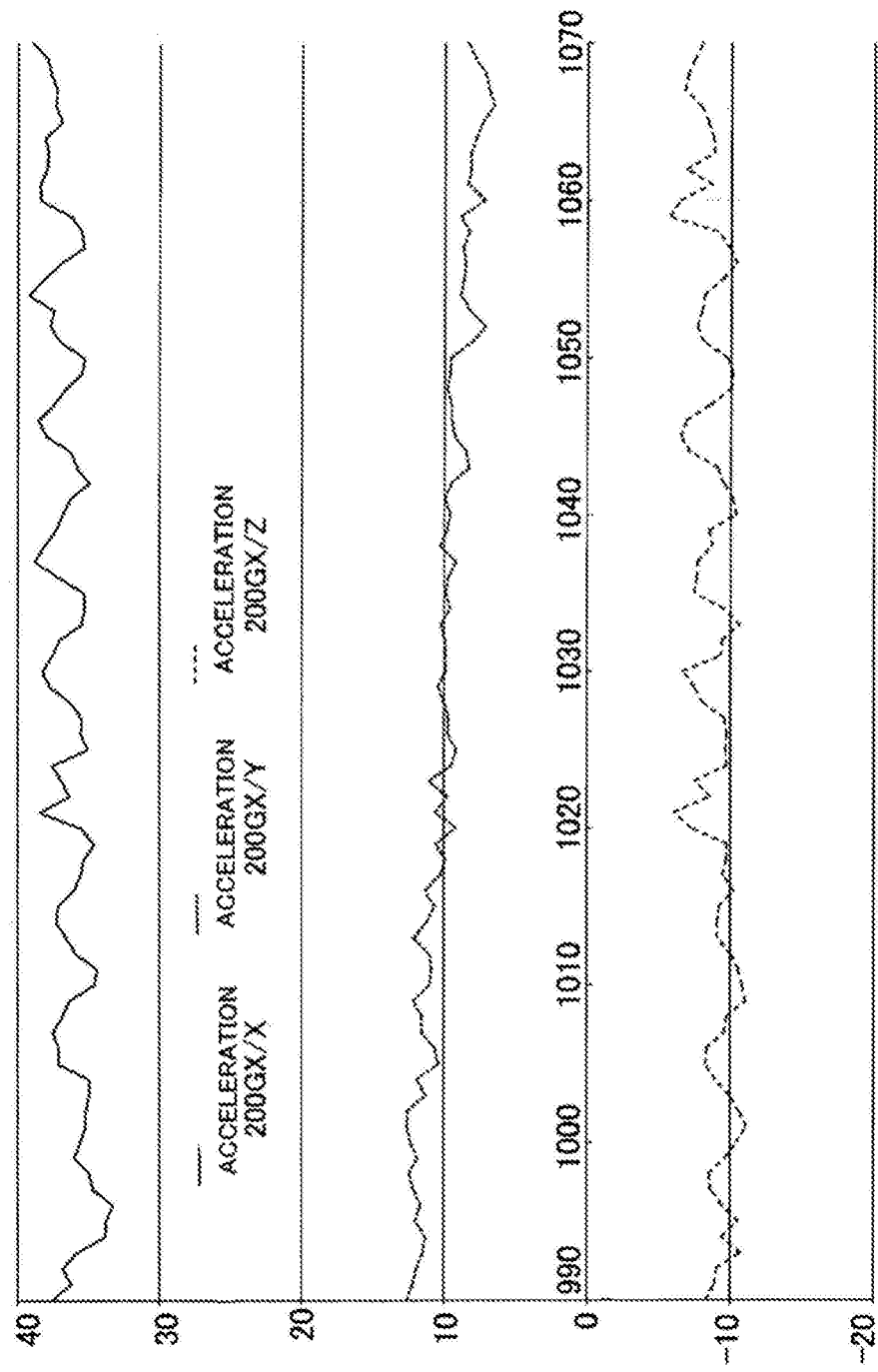

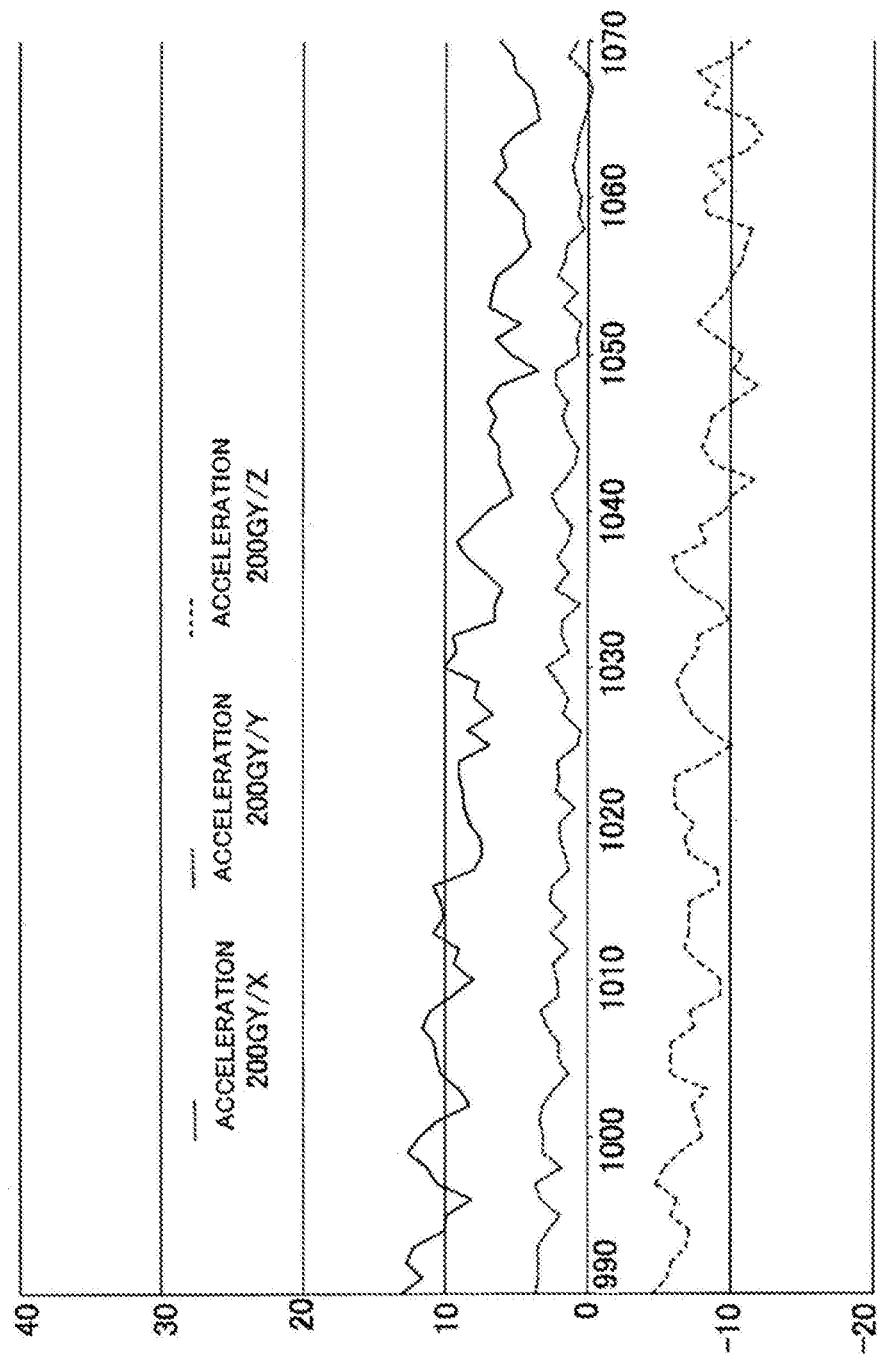

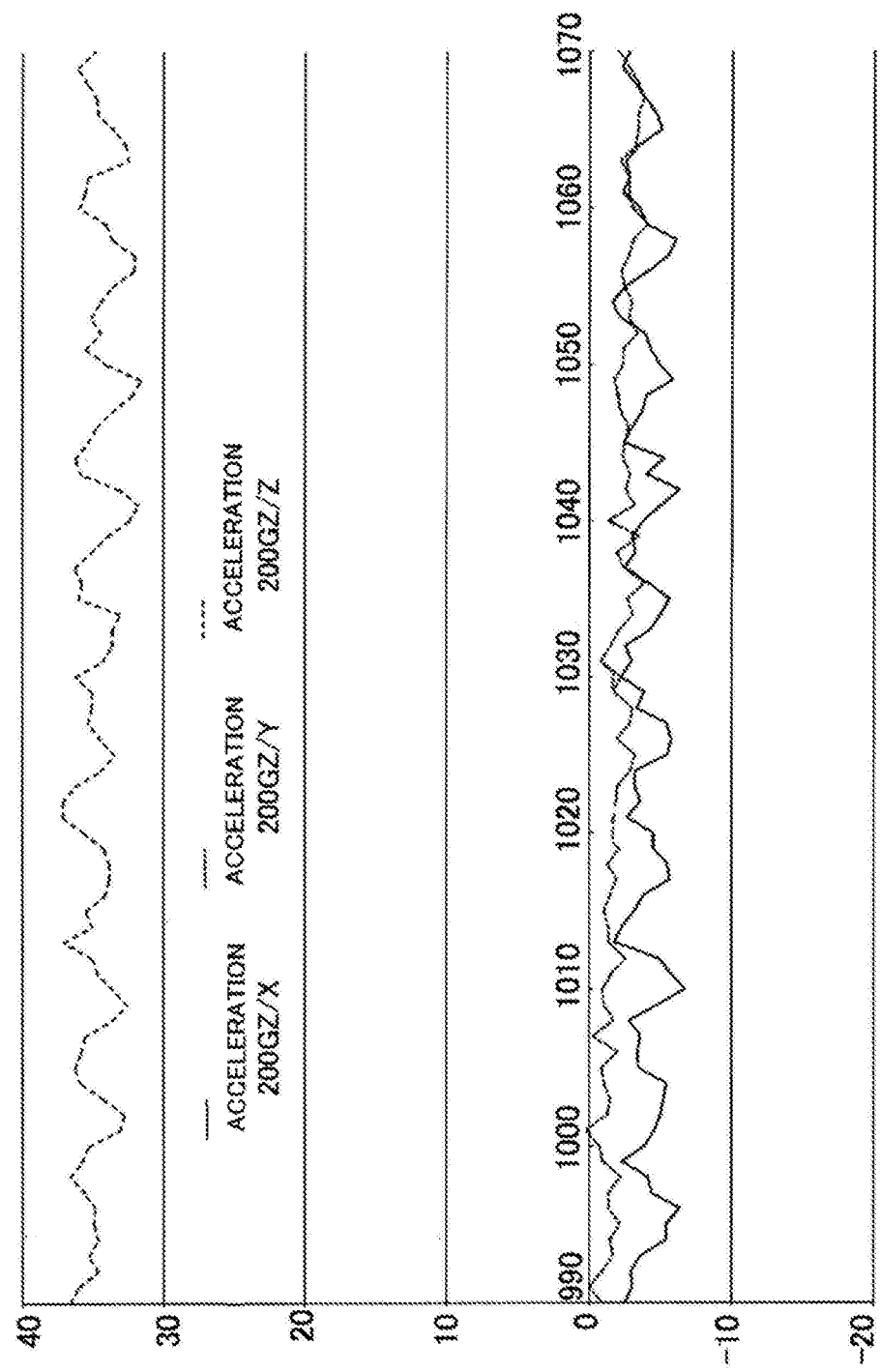

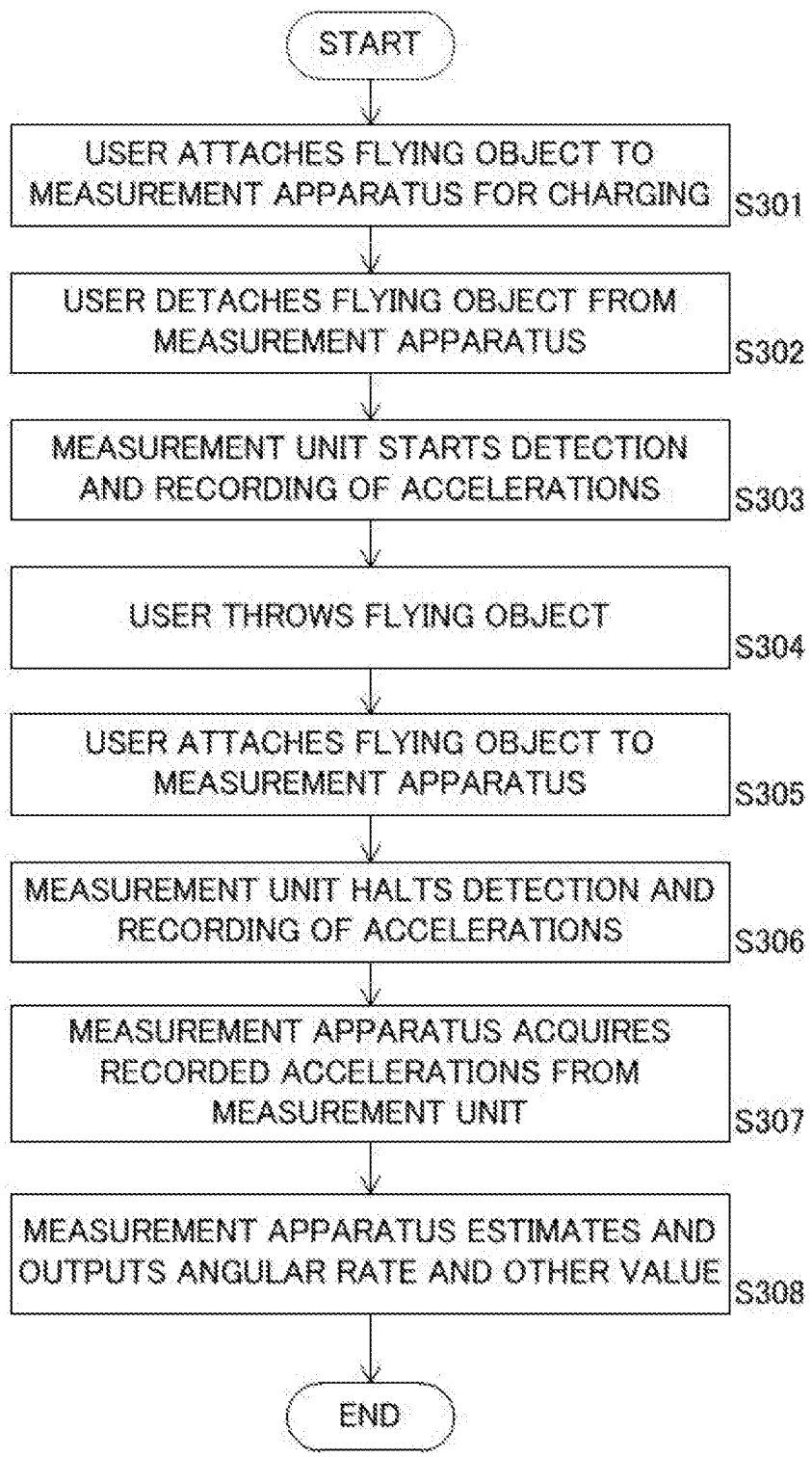

MEASUREMENT APPARATUS, MEASUREMENT METHOD, PROGRAM, AND INFORMATION RECORDING MEDIUM

TECHNICAL FIELD

The present disclosure relates to a measurement apparatus for measuring a spin rate per unit time of a flying object, a method of measuring the spin rate, a program for causing a computer to achieve the apparatus or the method, and a non-transitory computer-readable information recording medium storing the program thereon.

BACKGROUND ART

The trajectory of a ball thrown by a pitcher mainly depends on an initial velocity vector, a spin axis vector, and a spin rate per unit time of the ball. If these parameters can be objectively obtained, the parameters can contribute to evaluation of the condition of the pitcher and feedback to training for the pitcher.

The magnitude of the initial velocity vector of the ball can be determined with a radar gun immediately after completion of pitching the ball.

In addition, some techniques of measuring a spin rate per unit time of a ball have been proposed. For example, Patent Literature 1 discloses a technique of measuring a spin rate per unit time of a ball by measuring three-axis acceleration components of the ball with an acceleration sensor disposed near the center of gravity of the ball. In this technique, the relationship between the magnitude of the Magnus force and the spin rate of the ball and the relationship between the magnitude of the air resistance and the velocity of the ball are preliminarily obtained in other processes. Then, the velocity of the ball and its time variation are estimated based on the measured spin rate and the information on the Magnus force and the air resistance obtained based on measurement.

As described above, strong demand has arisen for observing the spin of various flying objects including balls as objective and accurate as possible.

CITATION LIST

Patent Literature

Patent Literature 1: Unexamined Japanese Patent Application Kokai Publication No. 2012-58066

SUMMARY OF INVENTION

Technical Problem

Undesirably, the collection of information on the air resistances and Magnus forces for individual balls requires a lot of work. Furthermore, if the measurement target is any flying object having an asymmetrical shape (for example, a javelin, discus, or hammer), the preliminary measurement of the information itself is hard.

In order to solve these problems, a technique of observing motions of flying objects, in particular, spins of the flying objects in the inertial coordinate system is required.

In addition, if the information on the Magnus forces and air resistances is obtained in advance, also required is a technique of observing, in particular, spins of the flying objects in the inertial coordinate system with higher accuracy based on the obtained information.

Another requirement is to obtain information on spin of a flying object during flight immediately after completion of the flight of the flying object.

An objective of the disclosure, which has been accomplished to satisfy the above requirements, is to provide a measurement apparatus for measuring a spin rate per unit time of a flying object, a method of measuring the spin rate, a program for causing a computer to achieve the apparatus or the method, and a non-transitory computer-readable information recording medium storing the program thereon.

Solution to Problem

According to an aspect of the disclosure, a primary acceleration sensor is fixed at the center of gravity of a flying object or at a position within a certain error range from the center of gravity. A secondary acceleration sensor is fixed inside the flying object so as to be spaced from the center of gravity. A measurement apparatus acquires a primary acceleration measured by the primary acceleration sensor during flight of the flying object and a secondary acceleration measured by the secondary acceleration sensor during the flight of the flying object, and estimates a spin rate per unit time of the flying object from the acquired primary acceleration and the acquired secondary acceleration using maximum likelihood estimation.

Advantageous Effects of Invention

The disclosure can provide a measurement apparatus for measuring a spin rate per unit time of a flying object, a method of measuring the spin rate, a program for causing a computer to achieve the apparatus or the method, and a non-transitory computer-readable information recording medium storing the program thereon.

BRIEF DESCRIPTION OF DRAWINGS

FIG. 3A is a graph illustrating variations in acceleration components measured by a primary acceleration sensor from the start of a pitching motion of a baseball until the catching of the baseball;

FIG. 3B is a graph illustrating variations in acceleration components measured by a secondary acceleration sensor (X-axis direction) from the start of the pitching motion of the baseball until the catching of the baseball;

FIG. 3C is a graph illustrating variations in acceleration components measured by a secondary acceleration sensor (Y-axis direction) from the start of the pitching motion of the baseball until the catching of the baseball;

FIG. 3D is a graph illustrating variations in acceleration components measured by a secondary acceleration sensor (Z-axis direction) from the start of the pitching motion of the baseball until the catching of the baseball;

FIG. 4A is a graph illustrating variations in acceleration components measured by the primary acceleration sensor during flight of the baseball;

FIG. 4B is a graph illustrating variations in acceleration components measured by the secondary acceleration sensor (X axis) during the flight of the baseball;

FIG. 4C is a graph illustrating variations in acceleration components measured by the secondary acceleration sensor (Y axis) during the flight of the baseball;

FIG. 4D is a graph illustrating variations in acceleration components measured by the secondary acceleration sensor (Z axis) during the flight of the baseball;

FIG. 8 is a flowchart illustrating a process of a measurement method according to the embodiment.

DESCRIPTION OF EMBODIMENTS

Embodiments of the disclosure will now be described. These embodiments are provided for illustrative purposes and should not be construed as limiting the scope of the invention. That is, persons skilled in the art can achieve another embodiment by replacing some or all components of the embodiments with their equivalents. A component illustrated in each embodiment may be appropriately omitted depending on the usage. Any of the embodiments provided in accordance with the principle of the invention is encompassed in the scope of the invention.

Embodiment 1

(Measurement Unit)

Figure 1:
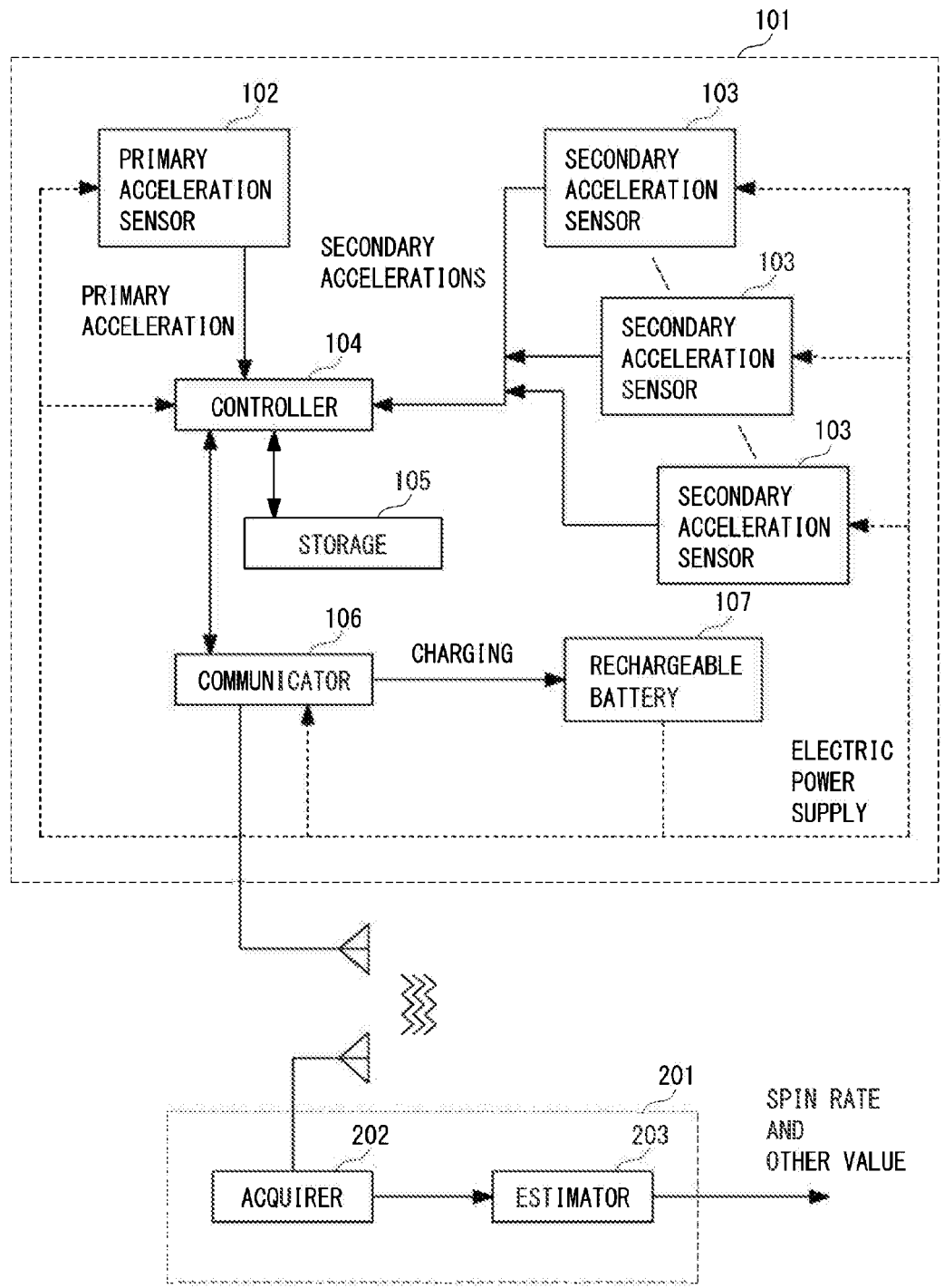
FIG. 1 is a diagram for illustrating schematic configurations of a measurement unit fixed inside a flying object and a measurement apparatus installed outside the flying object according to an embodiment of the disclosure.

In the embodiment, a measurement unit is fixed at the center of gravity of a flying object. FIG. 1 is a diagram for illustrating schematic configurations of the measurement unit fixed inside the flying object and a measurement apparatus installed outside the flying object according to an embodiment of the disclosure. The configurations will now be described with reference to this diagram.

Two types of triaxial acceleration sensors (a primary acceleration sensor 102 and secondary acceleration sensors 103) are fixed to a measurement unit 101. In the embodiment, these acceleration sensors are used to observe the spin of the flying object.

Although gyro sensors can also observe the spin, a typical gyro sensor has a large size and requires a high electric power consumption. In contrast, the acceleration sensors used in the embodiment are advantageous because the acceleration sensors can be fabricated at low cost, can have a small size, and require a low electric power consumption.

The primary acceleration sensor 102 is fixed at the center of gravity of the flying object or in the vicinity of the center of gravity (within a certain error range from the center of gravity). The primary acceleration sensor 102 mainly measures an acceleration caused by movement of the flying object.

The secondary acceleration sensors 103 are fixed inside the flying object so as to be spaced from the center of gravity of the flying object. The secondary acceleration sensors 103 mainly measure accelerations caused by spin of the flying object.

It is preferable that the secondary acceleration sensors 103 include at least three high acceleration sensors. It is preferable that the three displacement vectors from the primary acceleration sensor 102 to these three high acceleration sensors be substantially orthogonal to one another (within a certain error range of direction). The lengths of the three displacement vectors may be substantially equal to one another (within a certain error range of length).

For example, a hard ball for baseball or a golf ball is fabricated by winding or applying an elastic material around a core and then providing an outer shell. That is, the measurement unit 101 should be fixed at the center of the core. In contrast, a shot is composed of a uniform metal. That is, the measurement unit 101 should be disposed at the center of the shot.

A hollow ball (for example, a soft ball for baseball, a soccer ball, a tennis ball, or a volleyball) requires an elastic support (for example, a pole, a support branch, a support pole, or a support spring) extending from the outer shell to the vicinity of the center of gravity of the ball. The measurement unit should be disposed at the center of the ball.

The spin of other object (for example, a javelin, discus, hammer, or shot) used in sports can also be observed if the measurement unit is fixed at the center of gravity of the object.

The individual components of the measurement unit 101 are controlled by a controller 104. During flight of the flying object, the controller 104 reads the measured primary acceleration and secondary accelerations from the primary acceleration sensor 102 and the secondary acceleration sensors 103, respectively, and records the accelerations into a storage 105. The storage 105 is composed of, for example, a random access memory (RAM), a solid state disk (SSD), or a flash memory.

The accelerations recorded in the storage 105 are transmitted to the outside of the flying object via short-range wireless communication. The controller 104 controls a communicator 106 to determine whether the short-range wireless communication with the outside is available, and to transmit the measured accelerations read from the storage 105 to the outside if the communication is available.

A rechargeable battery 107 is charged using, for example, an antenna for communication included in the communicator 106 or a separate circuit.

For example, the spin of the flying object in a certain magnetic field can generate electric power due to electromagnetic induction. This electric power can be charged into the rechargeable battery 107. The rechargeable battery 107 supplies electric power to the primary acceleration sensor 102, the secondary acceleration sensors 103, the controller 104, the storage 105, and the communicator 106 for their operations.

The spin in this manner at a certain angular rate can calibrate the measurement unit 101. The procedure of calibration will be explained later.

The communication and charging can be performed via a connector for wired connection or performed after detachment of the measurement unit 101 from the flying object.

In order to facilitate an understanding, the following description illustrates a hard ball for baseball as an exemplary flying object.

The flying object freely falls during flight of the flying object. The acceleration measured by the primary acceleration sensor 102 is thus mainly caused by the Magnus force and resistance. In general, this acceleration is often smaller than the acceleration caused by spin of the flying object. Accordingly, the measurable range of the secondary acceleration sensors 103 should be broader than the measurable range of the primary acceleration sensor 102 to achieve more accurate measurement. It is preferable that the measurable range of the primary acceleration sensor 102 and the measurable range of the secondary acceleration sensors 103 be determined to measure accelerations depending on an expected traveling velocity or spin rate of the flying object. These ranges can be determined through experiments.

For example, in order to observe the spin of a breaking ball (hard ball for baseball) thrown by a pitcher, the primary acceleration sensor 102 should be a low acceleration sensor having a measurable range of approximately 5 G while the secondary acceleration sensors 103 should be high acceleration sensors having a measurable range of approximately 200 G, in the case where the distance between the primary acceleration sensor 102 and each of the secondary acceleration sensors (high acceleration sensors) 103 is approximately 7 mm. These values may be appropriately varied in accordance with the usage and purposes.

Figure 2:
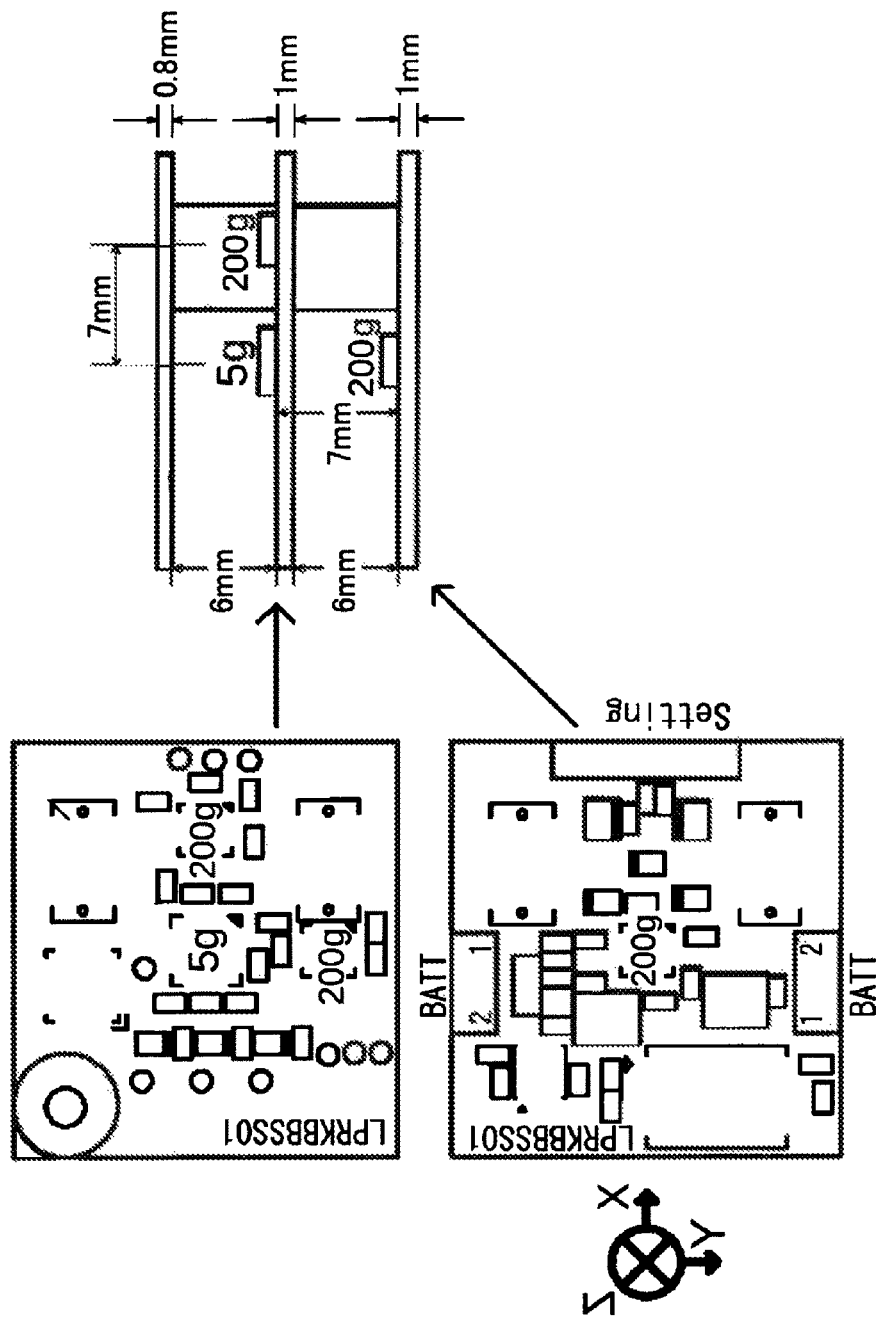
FIG. 2 is a diagram for illustrating the positions of acceleration sensors fixed to the measurement unit.

FIG. 2 is a diagram for illustrating the positions of the acceleration sensors fixed to the measurement unit. The positions will now be described with reference to this diagram.

On a bottom substrate (illustrated in the lower left part of the diagram) and an intermediate substrate (illustrated in the upper left part of the diagram) included in the measurement unit 101, the primary acceleration sensor 102 is disposed at the position indicated by "5 g" and the secondary acceleration sensors 103 are disposed at the three positions indicated by "200 g". The bottom substrate and the intermediate substrate are fixed so as to be spaced from each other, as illustrated in the side view (the right part of the diagram). In the side view, the secondary acceleration sensors 103 are located on the right, front, and lower sides of the primary acceleration sensor 102 so as to be spaced from the primary acceleration sensor 102 by an equal distance of 7 mm. The measurement unit including these substrates is small and as light as approximately 16 g, and thus can be provided inside the core of a hard ball for baseball.

(Measurement Apparatus)

A measurement apparatus 201 installed outside the flying object acquires accelerations measured during flight of the flying object from the measurement unit 101 and then estimates, for example, a spin rate per unit time of the flying object. This measurement apparatus 201 is typically achieved by execution of a program by a computer. This computer is connected to various output devices and input devices and thus transmits and receives information to and from these devices.

The program to be executed by a computer can be distributed and sold by a server to which the computer is communicably connected. Alternatively, the program may be recorded on a non-transitory information recording medium, such as a compact disk read only memory (CD-ROM), a flash memory, or an electrically erasable programmable ROM (EEPROM), and this non-transitory information recording medium may be distributed and sold, for example.

This program is installed into a non-transitory information recording medium, such as a hard disk, a solid state drive, a flash memory, or an EEPROM, included in the computer. The computer can thus achieve an information processing apparatus according to the embodiment. In general, a central processing unit (CPU) of a computer reads the program from the non-transitory information recording medium into a random access memory (RAM) and then interprets and executes codes contained in the program, under the management of an operating system (OS) of the computer. It should be noted that such explicit loading of the program into the RAM may be unnecessary in an architecture capable of mapping of the non-transitory information recording medium in a memory space accessible by the CPU. Various information required for the process of executing the program can be temporarily recorded in the RAM.

In place of such a general purpose computer configuring the information processing apparatus according to the embodiment, a dedicated electronic circuit may configure the information processing apparatus according to the embodiment. In this case, the program may also be used as a material for generating a wiring diagram of the electronic circuit or a timing chart, for example. This electronic circuit that satisfies the specifications defined in the program includes a field programmable gate array (FPGA) and an application specific integrated circuit (ASIC) and serves as a dedicated device that performs the functions defined in the program, thereby achieving the information processing apparatus according to the embodiment.

In order to facilitate an understanding, the following description assumes that the measurement apparatus 201 is achieved by execution of the program by a computer. The measurement apparatus 201 includes an acquirer 202 and an estimator 203.

The acquirer 202 acquires a primary acceleration measured by the primary acceleration sensor 102 and secondary accelerations measured by the secondary acceleration sensors 103 during flight of the flying object. These accelerations can be acquired from the measurement unit 101 fixed inside the flying object via wireless communication, as described above.

FIG. 3A is a graph illustrating variations in acceleration components measured by the primary acceleration sensor from the start of a pitching motion of a baseball until the catching of the baseball. FIG. 3B is a graph illustrating variations in acceleration components measured by the secondary acceleration sensor (X-axis direction) from the start of the pitching motion of the baseball until the catching of the baseball. FIG. 3C is a graph illustrating variations in acceleration components measured by the secondary acceleration sensor (Y-axis direction) from the start of the pitching motion of the baseball until the catching of the baseball. FIG. 3D is a graph illustrating variations in acceleration components measured by the secondary acceleration sensor (Z-axis direction) from the start of the pitching motion of the baseball until the catching of the baseball. As illustrated in these graphs, the time variations in the twelve acceleration components are acquired from the four acceleration sensors.

At the moment of completion of the pitching motion (around 980 in the temporal axis) and at the moment of catching the baseball (around 1080 in the temporal axis), some of the acceleration components define steep peaks or valleys due to the shocks. That is, the measured acceleration components during flight can be extracted between the moments.

FIG. 4A is a graph illustrating variations in acceleration components measured by the primary acceleration sensor during flight of the baseball. FIG. 4B is a graph illustrating variations in acceleration components measured by the secondary acceleration sensor (X axis) during the flight of the baseball. FIG. 4C is a graph illustrating variations in acceleration components measured by the secondary acceleration sensor (Y axis) during the flight of the baseball. FIG. 4D is a graph illustrating variations in acceleration components measured by the secondary acceleration sensor (Z axis) during the flight of the baseball. These graphs reveal that the measured acceleration components increase and decrease in cycles in accordance with the spin of the baseball and vary along increasing-decreasing trends in accordance with the drag force to the baseball during the flight of the baseball (from 990 to 1070 in the temporal axis).

Based on the primary acceleration and the secondary accelerations that are thus acquired, the estimator 203 estimates, for example, a spin rate (angular rate) per unit time of the flying object, the position of the center of spin of the flying object, and the direction of the spin axis (the spin axis direction in a coordinate system fixed to the flying object or the spin axis direction in the inertial coordinate system) using maximum likelihood estimation in a certain procedure.

In order to facilitate an understanding of the estimation procedure, the following description focuses on an example where the three displacement vectors from the primary acceleration sensor 102 to the secondary acceleration sensors 103 are orthogonal to one another and the secondary acceleration sensors 103 are spaced from the primary acceleration sensor 102 by an equal distance dL=7 mm. The directions of the respective displacement vectors are called the X axis, Y axis, and Z axis in the coordinate system (flying-object coordinate system) fixed to the measurement unit 101 and the flying object.

(Angular Rate/Spin Rate Per Unit Time)

The position vector x at a certain position in the flying object in the inertial coordinate system (coordinate system fixed to the ground) is expressed using the rotation matrix $M_{\omega t}$ as below, where $x_0$ indicates the position vector of the center of rotation, r indicates the radius vector from the center of rotation in the flying-object coordinate system, l indicates the spin axis vector, ω indicates the angular rate, and t indicates time.

$$x = x_0 + M_{\omega t} r \quad \text{Expression 1}$$

$$M_{\omega t} = \begin{pmatrix} l_x^2(1-\cos(\omega t)) + \cos(\omega t) & l_x l_y(1-\cos(\omega t)) - l_z \sin(\omega t) & l_x l_z(1-\cos(\omega t)) + l_y \sin(\omega t) \\ l_x l_y(1-\cos(\omega t)) + l_z \sin(\omega t) & l_y^2(1-\cos(\omega t)) + \cos(\omega t) & l_y l_z(1-\cos(\omega t)) - l_x \sin(\omega t) \\ l_x l_z(1-\cos(\omega t)) - l_y \sin(\omega t) & l_y l_z(1-\cos(\omega t)) + l_x \sin(\omega t) & l_x^2(1-\cos(\omega t)) + \cos(\omega t) \end{pmatrix}$$

$$l = (l_x, l_y, l_z)$$

The temporal differentiation of this expression provides the velocity and acceleration as below. It should be noted that the temporal differentiation is represented by a dot above a variable.

$$\dot{x} = \dot{x}_0 + \dot{M}_{\omega t} r + M_{\omega t} \dot{r}$$

$$\ddot{x} = \ddot{x}_0 + 2\dot{M}_{\omega t} \dot{r} + \ddot{M}_{\omega t} r + M_{\omega t} \ddot{r} \quad \text{Expression 2}$$

The radius vector r does not vary with time in the flying-object coordinate system. The first-order time differentiation of the radius vector r therefore results in zero vector.

$$r = \text{const}, \dot{r} = 0$$

$$\ddot{x} = \ddot{x}_0 + \ddot{M}_{\omega t} r + M_{\omega t} \ddot{r} \quad \text{Expression 3}$$

The second-order differentiated rotation matrix $M_{\omega t}$ is expressed as below through deformation.

$$\ddot{M}_{\omega t} = \omega^2 M_{\omega t} + \omega^2 l l^T \quad \text{Expression 4}$$

The second-order differentiated position vector x is therefore expressed as below.

$$\ddot{x} = \ddot{x}_0 - \omega^2 M_{\omega t} r + \omega^2 l l^T r + M_{\omega t} \ddot{r} \quad \text{Expression 5}$$

The following equation is satisfied, where g indicates the gravity acceleration and $a_d$ indicates the drag acceleration.

$$\ddot{x} = g, \ddot{x}_0 = g + a_d$$

$$g = g + a_d - \omega^2 M_{\omega t} r + \omega^2 l l^T r + M_{\omega t} \ddot{r}$$

$$M_{\omega t} \ddot{r} = -a_d + \omega^2 M_{\omega t} r - \omega^2 l l^T r \quad \text{Expression 6}$$

By multiplying both sides of this equation by the inverse of the rotation matrix $M_{\omega t}$, the second-order differentiated radius vector r is expressed as below.

$$M_{\omega t}^{-1} M_{\omega t} \ddot{r} = -M_{\omega t}^{-1} a_d + \omega^2 M_{\omega t}^{-1} M_{\omega t} r - \omega^2 M_{\omega t}^{-1} l l^T r$$

$$\ddot{r} = M_{\omega t}^{-1} a_d + \omega^2 r - \omega^2 M_{\omega t}^{-1} l l^T r \quad \text{Expression 7}$$

It should be noted that the inverse of the rotation matrix $M_{\omega t}$ is generated by inverse rotation of the rotation matrix $M_{\omega t}$ around the spin axis vector l by an angle of ωt. The spin axis vector l is not affected by the rotation of the rotation matrix $M_{\omega t}$. Accordingly, the following equation is satisfied.

$$M_{\omega t}^{-1} = M_{-\omega t}, M_{-\omega t} l = l \quad \text{Expression 8}$$

In addition, $l^T r$ indicates the inner product (l×r) of the spin axis vector l and the radius vector r.

$$\ddot{r} = -M_{-\omega t} a_d + \omega^2 r - \omega^2 (l \cdot r) l \quad \text{Expression 9}$$

In the following expressions, subscripts of variables are defined such that B represents the primary acceleration sensor 102 and X, Y, and Z represent the secondary acceleration sensors 103 in the respective axis directions. The spin angles of the primary acceleration sensor 102(B) and the secondary acceleration sensors 103(X, Y, Z) around the spin axis are indicated by θx, θY, and θz. Then, the acceleration (primary acceleration) to be measured by the primary acceleration sensor 102(B) and the accelerations (three secondary accelerations) to be measured by the secondary acceleration sensors 103(X, Y, Z) are expressed as below.

$$\ddot{r}_B = -M_{-\omega t} a_d + \omega^2 r_B - \omega^2 (l \cdot r_B) l$$

$$\ddot{r}_X = -M_{\theta_X} M_{-\omega t} a_d + \omega^2 r_X - \omega^2 (l \cdot r_X) l$$

$$\ddot{r}_Y = -M_{\theta_Y} M_{-\omega t} a_d + \omega^2 r_Y - \omega^2 (l \cdot r_Y) l$$

$$\ddot{r}_Z = -M_{\theta_Z} M_{-\omega t} a_d + \omega^2 r_Z - \omega^2 (l \cdot r_Z) l \quad \text{Expression 10}$$

The time averages of these equations over a cycle are expressed as below. It should be noted that the time average is represented by a bar above a variable.

$$\int_{t=\pi/\varpi}^{t=-\pi/\varpi} M_{-\omega t} dt = l \cdot l^T$$

-continued $$\bar{\ddot{r}}_B = -(\bar{l}\cdot\overline{a_d})\bar{l} + \overline{\omega}^2 r_B - \overline{\omega}^2(\bar{l}\cdot r_B)\bar{l}$$

$$\bar{\ddot{r}}_X = -(\bar{l}\cdot\overline{a_d})\bar{l} + \overline{\omega}^2 r_X - \overline{\omega}^2(\bar{l}\cdot r_X)\bar{l}$$

$$\bar{\ddot{r}}_Y = -(\bar{l}\cdot\overline{a_d})\bar{l} + \overline{\omega}^2 r_Y - \overline{\omega}^2(\bar{l}\cdot r_Y)\bar{l}$$

$$\bar{\ddot{r}}_Z = -(\bar{l}\cdot\overline{a_d})\bar{l} + \overline{\omega}^2 r_Z - \overline{\omega}^2(\bar{l}\cdot r_Z)\bar{l}$$

Then, the time-averaged acceleration measured by the primary acceleration sensor 102(B) is subtracted from each of the time-averaged accelerations measured by the secondary acceleration sensors 103(X, Y, Z).

$$\bar{\ddot{r}}_X - \bar{\ddot{r}}_B = \overline{\omega}^2(r_X - r_B) - \overline{\omega}^2\bar{l}\cdot(r_X - r_B)\bar{l}$$

$$\bar{\ddot{r}}_Y - \bar{\ddot{r}}_B = \overline{\omega}^2(r_Y - r_B) - \overline{\omega}^2\bar{l}\cdot(r_Y - r_B)\bar{l}$$   Expression 12

$$\bar{\ddot{r}}_Z - \bar{\ddot{r}}_B = \overline{\omega}^2(r_Z - r_B) - \overline{\omega}^2\bar{l}\cdot(r_Z - r_B)\bar{l}$$

In contrast, the displacement vectors from the primary acceleration sensor 102(B) to the secondary acceleration sensors 103(X, Y, Z) are expressed as below. If the displacement vectors are not orthogonal to one another or have mutually different lengths, the values of the elements of the flowing equations should be varied according to the characteristics of the displacement vectors.

$$r_X - r_B = (dL, 0, 0)$$

$$r_Y - r_B = (0, dL, 0)$$

$$r_Z - r_B = (0, 0, dL)$$

$$dL = 0.007 \, [m]$$   Expression 13

The components of the vectors are expressed as below. It should be noted that the bars above $l_x$, $l_y$, and $l_z$ are omitted on the assumption that the spin axis vector l does not vary with time within the cycle.

$$(\bar{\ddot{r}}_X - \bar{\ddot{r}}_B)_x = \omega^2 dL - \omega^2 l_x^2 dL$$

$$(\bar{\ddot{r}}_X - \bar{\ddot{r}}_B)_y = \omega^2 l_x^2 dL l_y$$

$$(\bar{\ddot{r}}_X - \bar{\ddot{r}}_B)_z = \omega^2 l_x^2 dL l_z$$

$$(\bar{\ddot{r}}_Y - \bar{\ddot{r}}_B)_x = \omega^2 l_y^2 dL l_x$$

$$(\bar{\ddot{r}}_Y - \bar{\ddot{r}}_B)_y = \omega^2 dL - \omega^2 l_y^2 dL$$

$$(\bar{\ddot{r}}_Y - \bar{\ddot{r}}_B)_z = \omega^2 l_y^2 dL l_z$$

$$(\bar{\ddot{r}}_Z - \bar{\ddot{r}}_B)_x = \omega^2 l_z^2 dL l_x$$

$$(\bar{\ddot{r}}_Z - \bar{\ddot{r}}_B)_y = \omega^2 l_z^2 dL l_y$$

$$(\bar{\ddot{r}}_Z - \bar{\ddot{r}}_B)_z = \omega^2 dL - \omega^2 l_z^2 dL$$   Expression 14

Since the length of the spin axis vector l equals 1, the angular rate ω is obtained based on the following expression. It should be noted that the angular rate ω is calculated by multiplying the spin rate per unit time by 2π (a single rotation by 360° expressed in radians).

$$(\bar{\ddot{r}}_X - \bar{\ddot{r}}_B)_x + (\bar{\ddot{r}}_Y - \bar{\ddot{r}}_B)_y + (\bar{\ddot{r}}_Z - \bar{\ddot{r}}_B)_z =$$   Expression 15

$$\omega^2 dL - \omega^2 l_x^2 dL + \omega^2 dL - \omega^2 l_y^2 dL + \omega^2 dL - \omega^2 l_z^2 dL$$

$$(\bar{\ddot{r}}_X - \bar{\ddot{r}}_B)_x + (\bar{\ddot{r}}_Y - \bar{\ddot{r}}_B)_y + (\bar{\ddot{r}}_Z - \bar{\ddot{r}}_B)_z =$$

$$3\omega^2 dL - \omega^2(l_x^2 + l_y^2 + l_z^2)dL$$

$$(\bar{\ddot{r}}_X - \bar{\ddot{r}}_B)_x + (\bar{\ddot{r}}_Y - \bar{\ddot{r}}_B)_y + (\bar{\ddot{r}}_Z - \bar{\ddot{r}}_B)_z = 2\omega^2 dL$$

$$\omega^2 = \frac{(\bar{\ddot{r}}_X - \bar{\ddot{r}}_B)_x + (\bar{\ddot{r}}_Y - \bar{\ddot{r}}_B)_y + (\bar{\ddot{r}}_Z - \bar{\ddot{r}}_B)_z}{2dL}$$

Based on the obtained angular rate ω, the values of $l_x$, $l_y$, and $l_z$ can be calculated form the first, fourth, and seventh equations of Expression 14. The other equations can be used to determine the signs (positive or negative) of $l_x$, $l_y$, and $l_z$.

The values of $l_x$, $l_y$, and $l_z$ are calculated after determination of the angular rate ω in the above-explained procedure. Expression 14 includes, however, nine equations and four unknown quantities ω, $l_x$, $l_y$, and $l_z$. That is, the number of equations is larger than the number of unknown quantities. Accordingly, the unknown quantities ω, $l_x$, $l_y$, and $l_z$ may be estimated using maximum likelihood estimation so as to minimize errors under the restriction that the sum of the squares of $l_x$, $l_y$, and $l_z$ equals 1.

Although the time averages should ideally be calculated over a single cycle of rotation, the objective of the calculation is to determine the cycle (angular rate ω). The time averages over a single cycle of rotation may therefore be replaced by the time averages over the entire flight time of the flying object. Alternatively, the time averages may be calculated over any period extracted from the flight time to obtain the angular rate during the period.

Although the above description is directed at three secondary acceleration sensors 103, four or more secondary acceleration sensors 103 may be provided. In this case, since the number of acquired restrictions is excessively larger than the number of unknown quantities, the estimation for minimizing errors is required for accurate measurement.

(Center of Spin in Flying-Object Coordinate System)

The primary acceleration sensor 102 is fixed in the vicinity of the center of gravity of the flying object (within a certain error range from the center of gravity) but is often deviated from the center of spin of the flying object. This deviation causes differences in the phases of the primary acceleration measured by the primary acceleration sensor 102 and the secondary accelerations measured by the secondary acceleration sensors 103.

Figure 5:
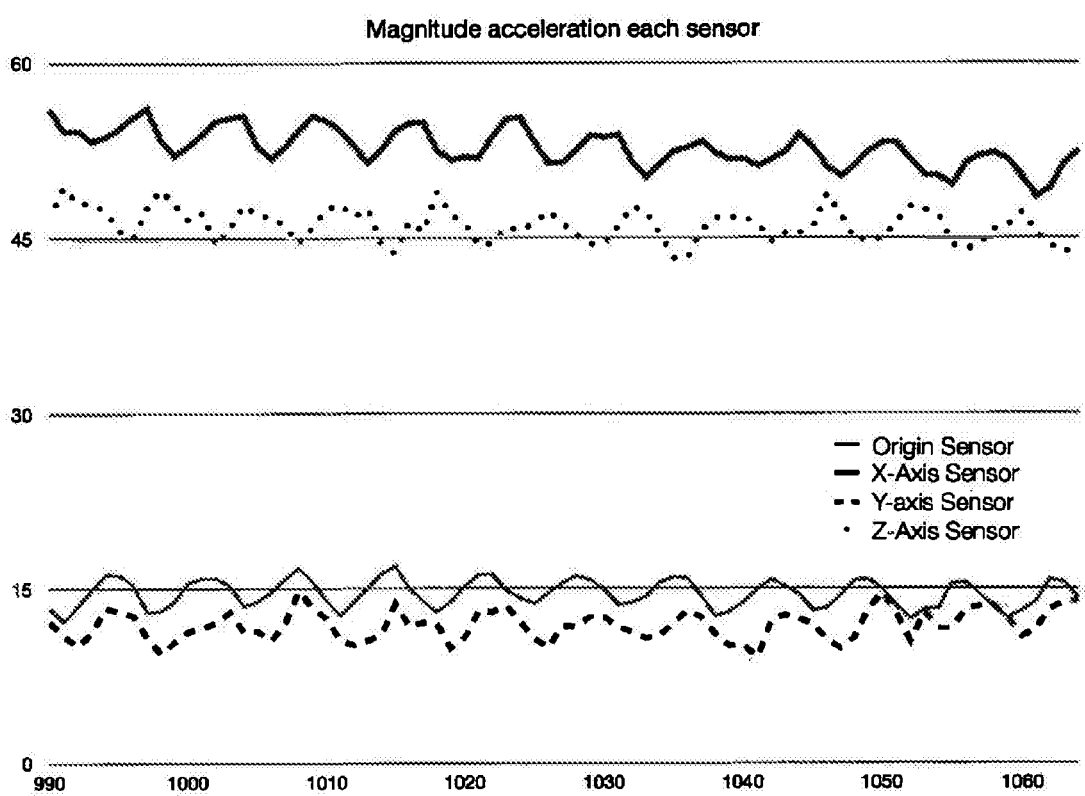
FIG. 5 is a graph illustrating time variations in the values of the accelerations measured by the acceleration sensors.

FIG. 5 is a graph illustrating time variations in the values of the accelerations measured by the acceleration sensors. The time variations will now be described with reference to this graph.

The graph illustrates exemplary values of accelerations measured by the primary acceleration sensor 102 and the secondary acceleration sensors 103 during flight of the flying object. The individual results indicate, in the order from the top, the (secondary) acceleration measured by the secondary acceleration sensor 103 in the X-axis direction, the (secondary) acceleration measured by the secondary acceleration sensor 103 in the Z-axis direction, the (primary) acceleration measured by the primary acceleration sensor 102 at the origin, and the (secondary) acceleration measured by the secondary acceleration sensor 103 in the Y-axis direction.

The phase differences between the results correspond to the differences in angle between the positions of the sensors as viewed in the spin axis direction.

In the example illustrated in the graph, the primary acceleration at the origin and the secondary acceleration in the Y-axis direction have small values and have substantially the same phase. This feature reveals that the spin axis extends in substantially the same direction as the Y axis. Accordingly, the phase differences between the secondary accelerations in the X- and Z-axis directions are expected to be about 90°.

The spin axis vector l can be calculated according to the above-explained procedure. The coordinates of the center of rotation can thus be determined using maximum likelihood estimation (for example, the least squares method or steepest descent method), such that the angles of the primary acceleration sensor 102 and the secondary acceleration sensors 103 around the spin axis are as close to the phase differences between the measured accelerations as possible when the sensors 102 and 103 are viewed in the spin axis direction, and such that phase errors are minimized.

Figure 6:
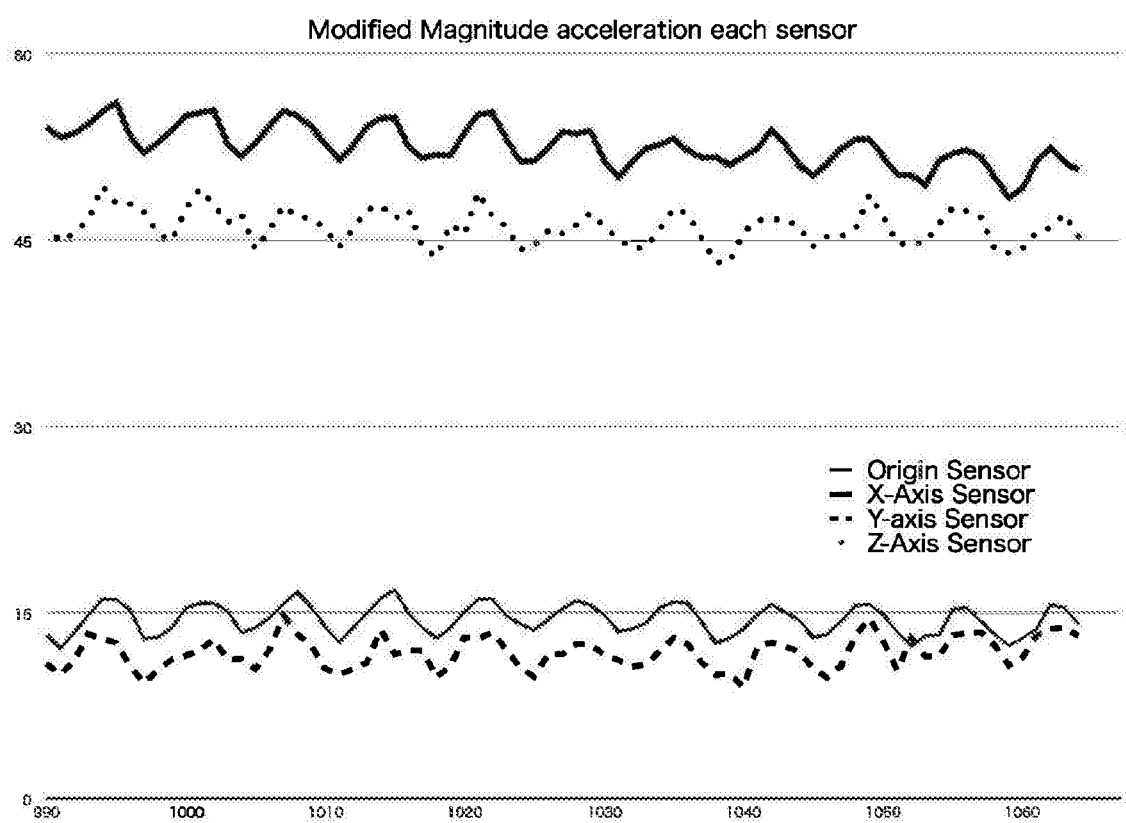
FIG. 6 is a graph generated by aligning the phases of the time variations in the values of the accelerations measured by the acceleration sensors.

FIG. 6 is a graph generated by aligning the phases of the time variations in the values of the accelerations measured by the acceleration sensors. Since the phases of the time variations are aligned as much as possible, the peaks of the values are synchronized with one another in this graph.

(Spin Axis Direction in Inertial Coordinate System)

The individual components of the spin axis vector in the flying-object coordinate system are calculated in the above-explained procedure. That is, coordinate transformation from the flying-object coordinate system into the inertial coordinate system is required to determine the spin axis around which the flying object rotates in the inertial coordinate system.

The primary acceleration sensor 102 and the secondary acceleration sensors 103 observe effects brought about by the centrifugal force due to spin and the drag force to the flying object (including the gravity, the frictional force that reduces the velocity, and the Magnus force that varies the trajectory).

The centrifugal force is expected to be constant provided that the angular rate and the spin axis do not vary. However, there is differences between the accelerations: (1) the accelerations that should be provided on the assumption that the sensors rotate around the center of spin and the spin axis that are calculated in the above-explained procedure; and (2) the accelerations that are actually measured. These differences are caused by a time variation in the drag force.

The magnitude of the drag force depends on the velocity of the flying object provided that the angular rate is constant. The direction of the drag force indicates a variation in the velocity vector of the flying object in the inertial coordinate system.

Figure 7A:
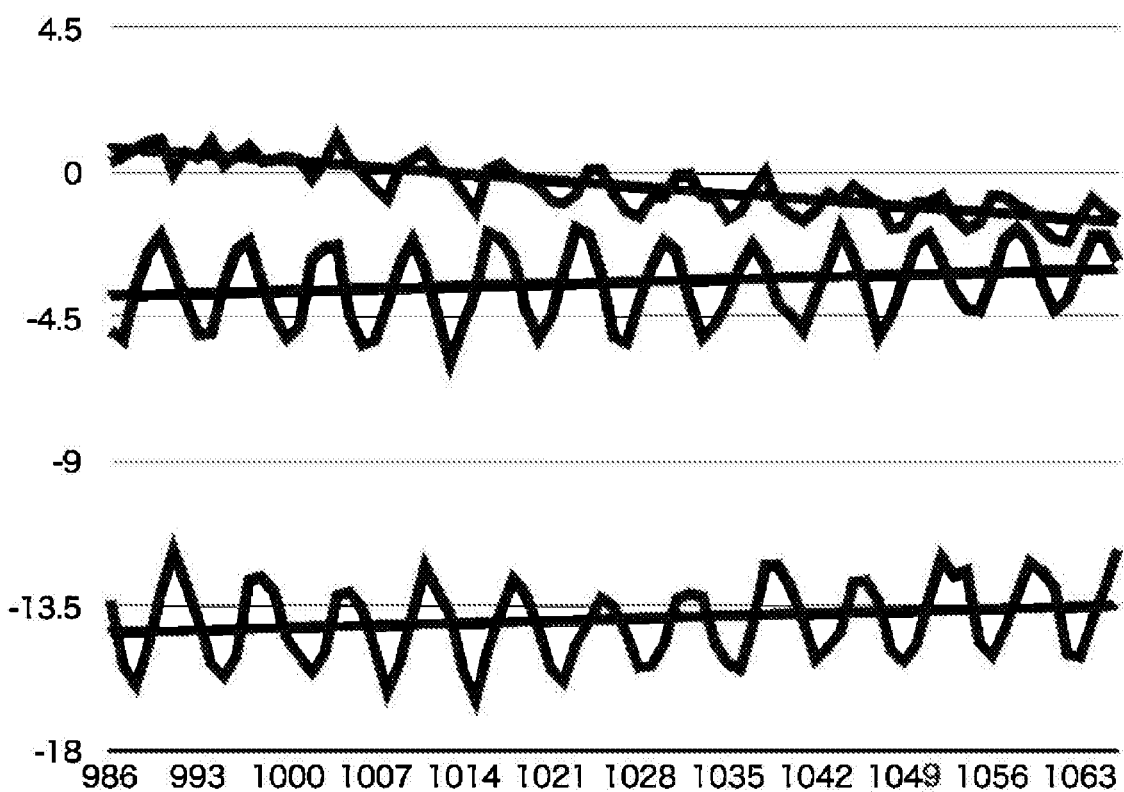
FIG. 7A is a graph illustrating increasing-decreasing trends of the time variations in the acceleration components measured by the primary acceleration sensor and trend straight lines.
Figure 7B:
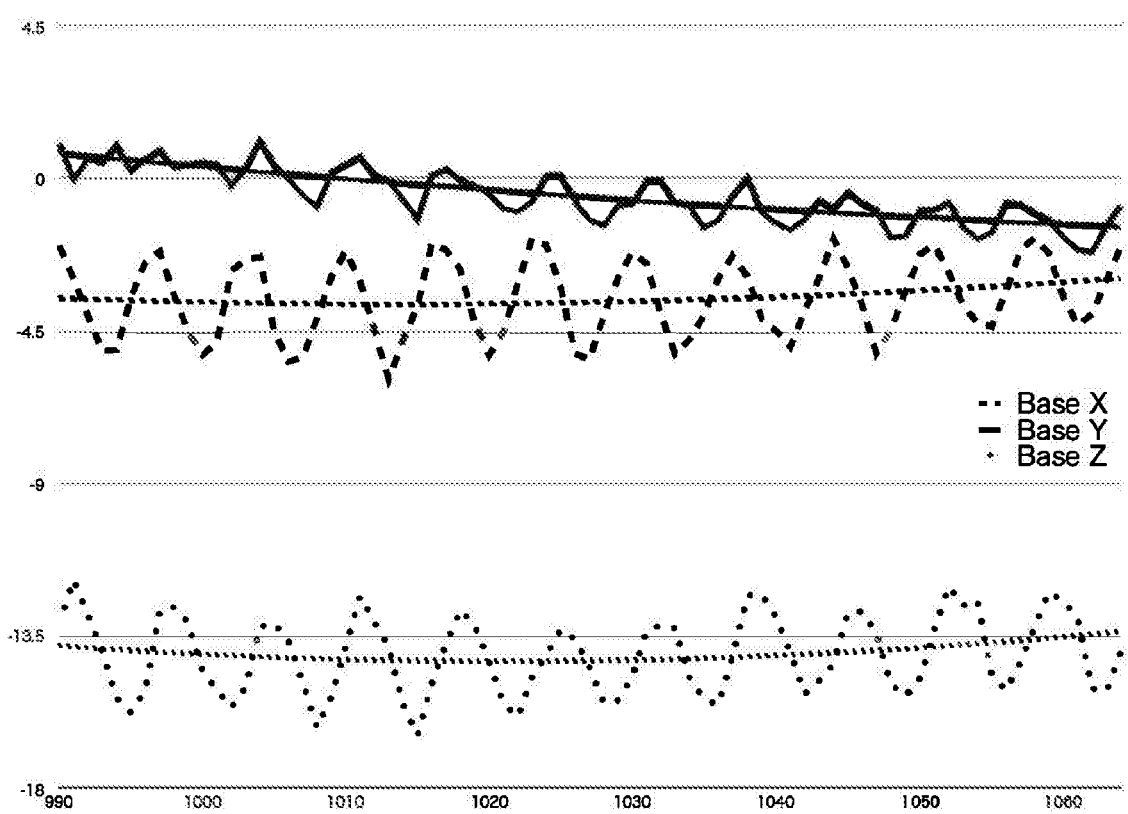
FIG. 7B is a graph illustrating increasing-decreasing trends of the time variations in the acceleration components measured by the primary acceleration sensor and trend curved lines.

FIG. 7A is a graph illustrating increasing-decreasing trends of the time variations in the acceleration components measured by the primary acceleration sensor and trend straight lines. FIG. 7B is a graph illustrating increasing-decreasing trends of the time variations in the acceleration components measured by the primary acceleration sensor and trend curved lines. The increasing-decreasing trends will now be described with reference to these graphs.

The graphs illustrate the individual acceleration components measured by the primary acceleration sensor 102, which is less affected by the centrifugal acceleration. In the graphs, the upper primary acceleration component gradually decreases, while the intermediate and lower primary acceleration components temporarily decrease and then gradually increase.

These decreasing and increasing trends can be analyzed by the least squares method. FIG. 7A illustrates the trend straight lines representing the increasing-decreasing trends acquired by the least squares method. FIG. 7B illustrates the quadratic regression curves representing the trends acquired by the least squares method.

The inclinations of the trend straight lines and the inclinations and variations of the trend curved lines indicate variations in the direction of the drag force in the flying-object coordinate system.

The forces applied to the flying object during a short period of flight of the flying object can be classified into the gravity, drag force, and Magnus force.

The drag force is applied in the direction opposite to the traveling direction of the flying object. The drag force reduces the velocity of the flying object but does not affect the traveling direction of the flying object. The traveling direction of the flying object is varied by the gravity and Magnus force.

The external force acceleration is determined by removing the centrifugal acceleration components from Expression 10.

$$\ddot{r}_B = -M_{-\omega,t}a_d + \omega^2 r_B - \omega^2(l \cdot r_B)l$$

$$M_{-\omega,t}a_d = -\ddot{r}_B + \omega^2 r_B - \omega^2(l \cdot r_B)l \qquad \text{Expression 16}$$

Then, as illustrated in FIG. 7B, the external force acceleration is approximated by a quadratic using the least squares method for each acceleration component in the X-, Y-, or Z-axis direction in the flying-object coordinate system measured by the primary acceleration sensor 102.

$$a_{d,t} = c_1 t^2 + c_2 t + c_3 \qquad \text{Expression 17}$$

In this expression, $a_{d,t}$ indicates the external force acceleration vector at the time t.

The variation $\Delta u$ in the traveling direction of the flying object during a period [s, e] of flight of the flying object is calculated as below.

$$\Delta u = \frac{a_{d,e}}{|a_{d,e}|} - \frac{a_{d,s}}{|a_{d,s}|} \qquad \text{Expression 18}$$

The following description will discuss a coordinate system for analyzing the variation in the traveling direction of the flying object. In this coordinate system, the individual coordinate axes are represented using small letters as "x axis", "y axis", and "z axis".

The z axis is defined so as to extend in the direction of the vector ($-\Delta u$). The direction vector k in the positive z-axis direction is calculated as below:

$$k = (-\Delta u)/|\Delta u|$$

Then, the y axis is defined so as to extend in the direction of throwing of the flying object. The direction vector j in the positive y-axis direction is calculated as below:

$$j = a_{d,s}/|a_{d,s}|$$

At last, the direction vector i in the positive x-axis direction is calculated as below:

$$i = j \times k$$

The effects brought about by the gravity and Magnus force to the flying object are expressed using the coordinate system of which the x, y, and z axes are defined by the three direction vectors i, j, and k. That is, the y axis indicates the traveling direction of the flying object, and the z axis indicates the direction of the resultant of the gravity and the Magnus force that vary the traveling direction of the flying object.

(Measurement Process)

FIG. 8 is a flowchart illustrating a process of a measurement method according to the embodiment. The process will now be explained with reference to this flowchart.

First, a user brings the flying object including the measurement unit 101 fixed thereinside close to the measurement apparatus 201 or connects the flying object to the measurement apparatus 201 and thus attaches the flying object to the measurement apparatus 201 so as to charge the measurement unit 101 (Step S301). In the case of charging using electromagnetic induction, the spin of the flying object 101 in a certain magnetic field induces electric power with the antenna for short-range wireless communication, thereby charging the rechargeable battery 107, as described above. Alternatively, the rechargeable battery 107 may be charged by varying the magnetic field generated in the measurement apparatus 201.

The user then detaches the flying object from the measurement apparatus 201 (Step S302). The controller 104 of the measurement unit 101 determines the communication with the measurement apparatus 201 via the communicator 106 to be unavailable and then starts detection of accelerations by the primary acceleration sensor 102 and the secondary acceleration sensors 103 and recording of the accelerations into the storage 105 (Step S303).

The user then throws the flying object, for example (Step S304). The flying object thus flies in the air. The detection and recording of the accelerations continue during flight of the flying object.

After catching or collecting the flying object, the user brings the flying object close to the measurement apparatus 201 or connects the flying object to the measurement apparatus 201 and thus attaches the flying object to the measurement apparatus 201 again (Step S305).

Then, the controller 104 of the measurement unit 101 determines the communication via the communicator 106 to be available and then halts detection and recording of the accelerations (Step S306) and starts to communicate with the acquirer 202 of the measurement apparatus 201. The acquirer 202 of the measurement apparatus 201 thus acquires the accelerations recorded in the storage 105 from the measurement unit 101 (Step S307).

After completion of acquisition of the accelerations, the estimator 203 of the measurement apparatus 201 estimates, for example, an angular rate (spin rate per unit time) of the flying object and a time variation in the spin axis vector in the flying-object coordinate system or the inertial coordinate system according to the above-explained procedure and then outputs the estimated values (Step S308). The process is then terminated.

After completion of acquisition of the accelerations, the charging of the rechargeable battery 107 of the measurement unit 101 is started to prepare for the subsequent measurement (refer to Step S301). Alternatively, the charging of the measurement unit 101 may be started at the time of attachment of the flying object to the measurement apparatus 201. This configuration can achieve automatic charging during the acquisition of the accelerations, thereby preventing the measurement unit 101 from being left uncharged. In addition, the configuration does not require an additional charging process, thereby reducing the time and work between one measurement and the subsequent measurement.

The charging procedure is not necessarily the above-described charging procedure using electromagnetic induction. For example, the charging may be performed with, for example, a separate circuit other than the antenna for communication connected to the communicator 106. Alternatively, the communication and charging may be performed via a connector for wired connection or performed after detachment of the measurement unit 101 from the flying object.

(Calibration)

A procedure of calibrating the values output from the primary acceleration sensor 102 and the secondary acceleration sensors 103 will now be explained.

As described above, the charging of the measurement unit 101 can be performed by rotating the flying object in a magnetic field. During the spin, the spin rate per unit time of this flying object can be controlled and observed from the outside.

The spin rate per unit time of the flying object rotated by an external force is compared with time variations in the primary acceleration and the secondary accelerations obtained from the measurement unit 101 and with the spin rate per unit time and the spin axis direction in the inertial coordinate system estimated by the measurement apparatus 201, thereby calibrating the values output from the primary acceleration sensor 102 and the secondary acceleration sensors 103 or correcting errors in the positions of the sensors 102 and 103.

Embodiment 2

The primary acceleration sensor 102 is disposed at the origin of the flying-object coordinate system and the three secondary acceleration sensors 103 are disposed on the respective X, Y, and Z axes of the flying-object coordinate system in the above-described embodiment. Alternatively, the number of the secondary acceleration sensors 103 may be reduced.

In Patent Literature 1, the spin rate per unit time of the flying object is obtained by the wavelet transform to the acceleration measured by the triaxial acceleration sensor disposed at the center of gravity of the flying object.

If the acceleration (time variations in three acceleration components) measured by the primary acceleration sensor 102 is subtracted from the acceleration (time variations in three or six acceleration components) measured by one or two secondary acceleration sensors 103, the acceleration mainly caused by spin can be obtained at a site spaced from the center of spin.

The obtained acceleration components are considered to be more accurate than the acceleration components measured in Patent Literature 1. Accordingly, the wavelet transform as in Patent Literature 1 to the acceleration components can provide the spin rate per unit time. In addition, an analyzing procedure, such as the fast Fourier transform, having a low computational load can also provide the spin rate per unit time with high accuracy.

In Expression 15 shown above, the angular rate is calculated with reference to the X, Y, and Z components of the primary acceleration measured by the primary acceleration sensor 102, the X component of the secondary acceleration measured by the secondary acceleration sensor 103 in the X-axis direction, the Y component of the secondary acceleration measured by the secondary acceleration sensor 103 in the Y-axis direction, and the Z component of the secondary acceleration measured by the secondary acceleration sensor 103 in the Z-axis direction.

For example, if only the secondary acceleration sensor 103 in the X-axis direction is used among the secondary acceleration sensors 103, the fast Fourier transform is applied to at least one of the values: (1) a value calculated by subtracting the X component of the primary acceleration from the X component of the secondary acceleration; (2) a value calculated by subtracting the Y component of the primary acceleration from the Y component of the secondary acceleration; and (3) a value calculated by subtracting the Z component of the primary acceleration from the Z component of the secondary acceleration. This operation yields the fundamental frequency, thereby providing the spin rate per unit time (the inverse of the fundamental frequency). If the operations for the three secondary acceleration sensors 103 provide different results, the spin rate per unit time can be determined by, for example, selecting one of the results by majority decision, averaging the results, or selecting the result derived from the acceleration component having the largest variation.

Although this embodiment is not capable of sufficient estimation of the spin axis direction, the embodiment has a simpler structure including less secondary acceleration sensors and can accurately obtain the spin rate per unit time by simpler calculations in comparison to those of existing techniques.

CONCLUSION

As described above, a measurement apparatus according to an embodiment includes: an acquirer that acquires a primary acceleration and a secondary acceleration, the primary acceleration being measured by a primary acceleration sensor during flight of a flying object, the primary acceleration sensor being fixed at the center of gravity of the flying object or at a position within a certain error range from the center of gravity, the secondary acceleration being measured by a secondary acceleration sensor during the flight of the flying object, the secondary acceleration sensor being fixed inside the flying object so as to be spaced from the center of gravity; and an estimator that estimates a spin rate per unit time of the flying object from the acquired primary acceleration and the acquired secondary acceleration using maximum likelihood estimation.

In the measurement apparatus according to the embodiment, it is preferable that the secondary acceleration sensor include at least three high acceleration sensors, that three displacement vectors from the primary acceleration sensor to the three high acceleration sensors be linearly independent from one another, and that the estimator estimate an angular rate vector of the flying object using maximum likelihood estimation.

In the measurement apparatus according to the embodiment, it is preferable that the three displacement vectors be substantially orthogonal to one another within a certain error range of direction, and that the three displacement vectors have substantially the same length within a certain error range of length.

In the measurement apparatus according to the embodiment, it is preferable that the primary acceleration sensor have a measurable range of primary acceleration that encompasses a range of acceleration caused by movement of the center of gravity during the flight of the flying object, that the secondary acceleration sensor have a measurable range of secondary acceleration that encompasses a range of acceleration caused by spin of the flying object during the flight of the flying object, and that the measurable range of secondary acceleration in the secondary acceleration sensor be broader than the measurable range of primary acceleration in the primary acceleration sensor.

In the measurement apparatus according to the embodiment, it is preferable that the primary acceleration and the secondary acceleration measured by the primary acceleration sensor and the secondary acceleration sensor during the flight of the flying object be recorded into a storage installed inside the flying object, and that the acquirer acquire the recorded primary acceleration and the recorded secondary acceleration from the storage via short-range wireless communication after termination of the flight of the flying object.

In the measurement apparatus according to the embodiment, it is preferable that the flying object include a controller that controls the short-range wireless communication and recording and acquisition of accelerations into and from the storage, and that the controller be charged with electric power supplied via the short-range wireless communication and operate on the charged electric power.

A measurement method according to an embodiment includes: measuring a primary acceleration by a primary acceleration sensor during flight of a flying object, the primary acceleration sensor being fixed at the center of gravity of the flying object or at a position within a certain error range from the center of gravity; measuring a secondary acceleration by a secondary acceleration sensor during the flight of the flying object, the secondary acceleration sensor being fixed inside the flying object so as to be spaced from the center of gravity; acquiring the measured primary acceleration and the measured secondary acceleration by an information processing apparatus; and estimating a spin rate per unit time of the flying object from the acquired primary acceleration and the acquired secondary acceleration using maximum likelihood estimation by the information processing apparatus.

A program according to an embodiment causes a computer to function as: an acquirer that acquires a primary acceleration and a secondary acceleration, the primary acceleration being measured by a primary acceleration sensor during flight of a flying object, the primary acceleration sensor being fixed at the center of gravity of the flying object or at a position within a certain error range from the center of gravity, the secondary acceleration being measured by a secondary acceleration sensor during the flight of the flying object, the secondary acceleration sensor being fixed inside the flying object so as to be spaced from the center of gravity; and an estimator that estimates a spin rate per unit time of the flying object from the acquired primary acceleration and the acquired secondary acceleration using maximum likelihood estimation.

A non-transitory computer-readable information recording medium according to an embodiment stores the program thereon.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the priority from Japanese Patent Application No. 2016-026361, filed with the Japan Patent Office on Feb. 15, 2016 (Monday), the entire disclosure of which is incorporated by reference herein to the extent permitted by the laws of the designated countries.

INDUSTRIAL APPLICABILITY

The disclosure can provide a measurement apparatus for measuring a spin rate per unit time of a flying object, a method of measuring the spin rate, a program for causing a computer to achieve the apparatus or the method, and a non-transitory computer-readable information recording medium storing the program thereon.

REFERENCE SIGNS LIST

101 Measurement unit
102 Primary acceleration sensor
103 Secondary acceleration sensor
104 Controller
105 Storage
106 Communicator
107 Rechargeable battery
201 Measurement apparatus
202 Acquirer
203 Estimator

What is claimed is:

1. A measurement apparatus comprising:
an acquirer that acquires a primary acceleration and a secondary acceleration,
the primary acceleration being measured by a primary linear acceleration sensor during flight of a flying object,
the primary linear acceleration sensor being fixed at a center of gravity of the flying object or at a position within a certain error range from the center of gravity,
the secondary acceleration being measured by a secondary linear acceleration sensor during the flight of the flying object,
the secondary linear acceleration sensor being fixed inside the flying object so as to be spaced from the center of gravity; and
an estimator that estimates a spin rate per unit time of the flying object from the acquired primary acceleration and the acquired secondary acceleration using maximum likelihood estimation.

2. The measurement apparatus according to claim 1, wherein
the secondary linear acceleration sensor comprises at least three high linear acceleration sensors,
three displacement vectors from the primary linear acceleration sensor to the three high linear acceleration sensors are linearly independent from one another, and
the estimator estimates an angular rate vector of the flying object using maximum likelihood estimation.

3. The measurement apparatus according to claim 2, wherein
the three displacement vectors are substantially orthogonal to one another within a certain error range of direction, and
the three displacement vectors have substantially the same length within a certain error range of length.

4. The measurement apparatus according to claim 1, wherein
the primary linear acceleration sensor has a primary measurable range of primary acceleration,
the secondary linear acceleration sensor has a secondary measurable range of secondary acceleration, and
the secondary measurable range of secondary acceleration in the secondary linear acceleration sensor is broader than the primary measurable range of primary acceleration in the primary linear acceleration sensor.

5. The measurement apparatus according to claim 1, wherein
the primary acceleration and the secondary acceleration measured by the primary linear acceleration sensor and the secondary linear acceleration sensor during the flight of the flying object are recorded into a storage installed inside the flying object, and
the acquirer acquires the recorded primary acceleration and the recorded secondary acceleration from the storage via short-range wireless communication after termination of the flight of the flying object.

6. The measurement apparatus according to claim 5, wherein
the flying object includes a controller that controls the short-range wireless communication and recording and acquisition of accelerations into and from the storage, and
the controller is charged with electric power supplied via the short-range wireless communication and operates on the charged electric power.

7. The measurement apparatus according to claim 1, wherein
a secondary maximum linear acceleration which the secondary linear acceleration sensor can measure is higher than a primary maximum linear acceleration which the primary linear acceleration sensor can measure.

8. A measurement method comprising:
measuring a primary acceleration by a primary linear acceleration sensor during flight of a flying object,
the primary linear acceleration sensor being fixed at a center of gravity of the flying object or at a position within a certain error range from the center of gravity;
measuring a secondary acceleration by a secondary linear acceleration sensor during the flight of the flying object,
the secondary linear acceleration sensor being fixed inside the flying object so as to be spaced from the center of gravity;
acquiring the measured primary acceleration and the measured secondary acceleration by an information processing apparatus; and
estimating a spin rate per unit time of the flying object from the acquired primary acceleration and the acquired secondary acceleration using maximum likelihood estimation by the information processing apparatus.

9. A non-transitory computer-readable information recording medium recording a program that causes a computer to:
acquire a primary acceleration and a secondary acceleration,
the primary acceleration being measured by a primary linear acceleration sensor during flight of a flying object,
the primary linear acceleration sensor being fixed at a center of gravity of the flying object or at a position within a certain error range from the center of gravity,
the secondary acceleration being measured by a secondary linear acceleration sensor during the flight of the flying object,
the secondary linear acceleration sensor being fixed inside the flying object so as to be spaced from the center of gravity; and
estimate a spin rate per unit time of the flying object from the acquired primary acceleration and the acquired secondary acceleration using maximum likelihood estimation.

10. A measurement apparatus including a processor and a memory storing a program, the program comprising:
   an acquiring code that causes the processor to acquire a primary acceleration and a secondary acceleration,
      the primary acceleration being measured by a primary linear acceleration sensor during flight of a flying object,
      the primary linear acceleration sensor being fixed at a center of gravity of the flying object or at a position within a certain error range from the center of gravity,
      the secondary acceleration being measured by a secondary linear acceleration sensor during the flight of the flying object,
      the secondary linear acceleration sensor being fixed inside the flying object so as to be spaced from the center of gravity; and
   an estimating code that causes the processor to estimate a spin rate per unit time of the flying object from the acquired primary acceleration and the acquired secondary acceleration using maximum likelihood estimation.

11. The measurement apparatus according to claim 10, wherein
   the secondary linear acceleration sensor comprises at least three high linear acceleration sensors,
   three displacement vectors from the primary linear acceleration sensor to the three high linear acceleration sensors are linearly independent from one another, and
   the estimating code causes the processor to estimate an angular rate vector of the flying object using maximum likelihood estimation.

12. The measurement apparatus according to claim 11, wherein
   the three displacement vectors are substantially orthogonal to one another within a certain error range of direction, and
   the three displacement vectors have substantially the same length within a certain error range of length.

13. The measurement apparatus according to claim 10, wherein
   the primary linear acceleration sensor has a primary measurable range of primary acceleration,
   the secondary linear acceleration sensor has a secondary measurable range of secondary acceleration, and
   the secondary measurable range of secondary acceleration in the secondary linear acceleration sensor is broader than the primary measurable range of primary acceleration in the primary linear acceleration sensor.

14. The measurement apparatus according to claim 10, wherein
   the primary acceleration and the secondary acceleration measured by the primary linear acceleration sensor and the secondary linear acceleration sensor during the flight of the flying object are recorded into a storage installed inside the flying object, and
   the acquiring code causes the processor to acquire the recorded primary acceleration and the recorded secondary acceleration from the storage via short-range wireless communication after termination of the flight of the flying object.

15. The measurement apparatus according to claim 14, wherein
   the flying object includes a controller that controls the short-range wireless communication and recording and acquisition of accelerations into and from the storage, and
   the controller is charged with electric power supplied via the short-range wireless communication and operates on the charged electric power.

16. The measurement apparatus according to claim 10, wherein
   a secondary maximum linear acceleration which the secondary linear acceleration sensor can measure is higher than a primary maximum linear acceleration which the primary linear acceleration sensor can measure.

* * * * *